(12) United States Patent
Mandare

(10) Patent No.: US 11,384,846 B2
(45) Date of Patent: Jul. 12, 2022

(54) TOP ENTRY BALL VALVE AND METHOD

(71) Applicant: WORLDWIDE OILFIELD MACHINE, INC., Houston, TX (US)

(72) Inventor: Rahul Mandare, Pune (IN)

(*) Notice: Subject to any disclaimer, the term of this patent is extended or adjusted under 35 U.S.C. 154(b) by 0 days.

(21) Appl. No.: 17/179,314

(22) Filed: Feb. 18, 2021

(65) Prior Publication Data
US 2021/0262574 A1  Aug. 26, 2021

Related U.S. Application Data

(60) Provisional application No. 63/093,494, filed on Oct. 19, 2020, provisional application No. 62/979,030, filed on Feb. 20, 2020.

(51) Int. Cl.
*F16K 5/20* (2006.01)
*F16K 5/06* (2006.01)
*F16K 27/06* (2006.01)

(52) U.S. Cl.
CPC ............ *F16K 5/201* (2013.01); *F16K 5/0636* (2013.01); *F16K 5/0689* (2013.01); *F16K 27/067* (2013.01); *Y10T 137/0508* (2015.04); *Y10T 137/6045* (2015.04)

(58) Field of Classification Search
CPC ...... F16K 5/0636; F16K 5/201; F16K 5/0689; F16K 27/067; Y10T 137/6045; Y10T 137/0508; B25B 27/24
See application file for complete search history.

(56) References Cited

U.S. PATENT DOCUMENTS

| | | | | |
|---|---|---|---|---|
| 3,164,362 A | * | 1/1965 | Lavigueur | F16K 5/0673 251/174 |
| 3,245,653 A | * | 4/1966 | Lavigueur | F16K 5/201 251/159 |
| 3,339,886 A | | 9/1967 | Grove | |
| 3,504,885 A | | 4/1970 | Hulsey | |
| 3,771,545 A | * | 11/1973 | Allen | F16K 5/0673 137/315.21 |
| 3,920,036 A | * | 11/1975 | Westenrieder | F16K 5/202 137/315.21 |
| 3,934,606 A | * | 1/1976 | Matthews | F16K 5/204 137/454.6 |
| 4,151,855 A | * | 5/1979 | Levin | F16K 5/0636 137/15.22 |
| 4,175,577 A | * | 11/1979 | Kacal | F16K 5/0636 137/15.22 |
| 4,262,691 A | * | 4/1981 | Kacal | F16K 5/0626 137/315.21 |
| 4,390,039 A | * | 6/1983 | Johnson | F16K 5/0636 137/315.21 |

(Continued)

*Primary Examiner* — David Colon-Morales
(74) *Attorney, Agent, or Firm* — Kenneth L. Nash; Thomas D. Nash

(57) ABSTRACT

A top entry ball valve a pipeline mainly used in Oil and Gas Industry, Chemical and pharmaceutical Industries. The system allows for replacing all the ball valve components and seals while the valve body is still in the pipeline. The ball valve assembly has four main components: the body, gearbox, ball, and seats. Disassembly and reassembly may be performed utilizing various tools to allow removal and reinstallation of the ball, seats, seals, or other components therein without the need to remove the ball valve assembly from a pipeline.

10 Claims, 23 Drawing Sheets

(56) References Cited

U.S. PATENT DOCUMENTS

| | | | | |
|---|---|---|---|---|
| 4,562,860 A * | 1/1986 | Walter | ................... | F16K 5/0636 |
| | | | | 137/454.6 |
| 4,566,482 A * | 1/1986 | Stunkard | ............... | F16K 5/0636 |
| | | | | 137/315.21 |
| 4,587,990 A * | 5/1986 | Pennell | ................... | F16K 5/0636 |
| | | | | 137/454.2 |
| 4,641,681 A * | 2/1987 | Ikematsu | ............... | F16K 5/0636 |
| | | | | 137/315.21 |
| 4,676,480 A * | 6/1987 | Garceau | ................... | F16K 5/201 |
| | | | | 251/159 |
| 4,718,444 A * | 1/1988 | Boelte | ................... | F16K 5/0636 |
| | | | | 137/15.22 |
| 4,815,701 A * | 3/1989 | Stone | ................... | F16K 5/0673 |
| | | | | 251/174 |
| 5,117,858 A * | 6/1992 | Osthues | ................ | F16K 5/0636 |
| | | | | 137/315.21 |
| 5,253,843 A * | 10/1993 | Garceau | ................... | F16K 5/201 |
| | | | | 251/159 |
| 5,320,327 A | 6/1994 | Beson | | |
| 5,338,003 A | 8/1994 | Beson | | |
| 5,494,256 A | 8/1996 | Beson | | |
| 6,681,793 B2 * | 1/2004 | Mike | ..................... | F16K 5/0636 |
| | | | | 137/15.22 |
| 7,516,941 B2 * | 4/2009 | Combs | ................... | F16K 5/0647 |
| | | | | 251/248 |
| 9,791,048 B2 * | 10/2017 | Jackson | ................ | F16K 5/0636 |
| 9,835,259 B2 * | 12/2017 | Shah | ..................... | F16K 5/0636 |
| 10,030,784 B2 | 7/2018 | Lanning | | |
| 2017/0299072 A1 * | 10/2017 | Hawa | ..................... | F16K 5/201 |

* cited by examiner

Case 1. Valve is in 0 Degree Open Position

Case 2. Valve is in 90 Degree Close Position

Case 3. Valve is in 135 Degree Intermediate Position

TOP ENTRY BALL VALVE AND METHOD

This application claims the benefit of U.S. provisional applications No. 62/979,030 filed Feb. 20, 2020 and 63/093,494 filed Oct. 19, 2020, which are incorporated herein by reference.

BACKGROUND OF THE INVENTION

Field of the Invention

The present invention relates generally to a Top Entry Ball Valve for a pipeline mainly used in Oil and Gas Industry, Chemical and pharmaceutical Industries. Pipelines are well known in the industry and generally relatively high pressure metallic pipes, which may be pressured up to several thousand pounds, and used to transport fluids such as oil, gas, and related fluids over a distance Pipelines may be hundreds of miles long, a few hundred yards long, or simply a few feet long. A Valve is a device that may be used to regulate, direct or control the flow of a fluid (gases, liquids, fluidized solids, or slurries) through a pipeline, pipe, or other fluid carrying tube by opening, closing, or partially obstructing various passageways through the pipeline or other fluid carrying pipe.

Background of the Invention

A ball valve as used herein is preferably a form of quarter-turn valve which uses a pivoting or rotating ball to control flow through the ball valve. The ball has a hole therethrough that may be oriented in line with the pipeline to allow fluid flow through the valve and pipeline or moved orthogonal or at a ninety degree angle with respect to the pipeline to prevent fluid flow through the valve or pipeline. The ball valve is "open" or in an "open position" or a "valve open position" when the ball's hole is in line with the flow through the pipeline. The ball valve is "closed", in a "closed position", or a "closed valve position," or "valve closed position" when the ball is pivoted 90-degrees by the operator. The operator may comprise a valve handle, or a wheel, and/or a gearbox, a motor, a combination thereof or any other well-known mechanism to open/close the valve.

When the operator of a quarter turn valve is a handle, the handle is normally and preferably in alignment with the flow through the pipeline when open, and is perpendicular to the pipeline when closed, making for easy visual confirmation of the valve's status open or closed.

Ball valves are durable, performing well after many cycles, and reliable, closing securely even after long periods of disuse. These qualities make them an excellent choice for shutoff and control applications, where they are often preferred to gates and globe valves.

They are compact and quick to open and close.
Types can be based on body construction.
There are several body styles of ball valves: a) Single one piece body, top entry, b) Split three-piece body, c) Split two-piece body, and d) welded end.

The difference is based on how the pieces of the valve—especially the casing that contains the ball itself—are manufactured and assembled. The valve operation is the same in each case.

Types of ball valves may also be based on pressure:
a) Low pressure ball valves and b) High pressure ball valves.

In most industries, the ball valves with working pressure higher than 3000 psi are considered as high pressure ball valves and those working between 280 psi to 3000 psi are medium pressure.

Ball valves are normally used as medium pressure valves best suited for pipeline applications as per API (American Petroleum Industries) 6D specification.

Usually the maximum working pressure for the high pressure ball valves is 10000 psi as per API 6A (American Petroleum Industries) specification.

Types of ball valves may be based on bore/port:

Full Port—A full port or commonly known full bore ball valve has an oversized ball so that the hole is in the ball is the same size as the pipeline resulting in lower friction loss. Flow is unrestricted but the valve is larger and more expensive so this is only used where free flow is required, for example in pipelines which require pigging.

Reduced port or reduced bore—In Reduced port (more commonly known as reduced bore) ball valves, flow through the valve is one pipe size smaller than the valve's pipe size resulting in flow area being smaller than pipe.

V port—A V port ball valve has either a "v" shaped ball or a "v" shaped seat. This allows for linear and even equal percentage flow characteristics. When the valve is in the closed position and opening is commenced the small end of the "v" is opened first allowing stable flow control during this stage. This type of design requires a generally more robust construction due to higher velocities of the fluids, which might damage a standard valve. These can be referred to as a type of control valve but are typically not as accurate as a balancing valve, needle valve, globe valve, or pressure regulating valve.

Multiport—Multiport valves have one inlet and three to four outlets.

Types of ball valves may be based further on ball movement:

Trunnion Mounted ball valve—A trunnion mounted ball valve has additional mechanical anchoring called trunnions at the top and bottom on the ball. This makes the ball fixed in its position whereas the seats are floating under the influence of spring and line pressure. This special mounting is suitable for larger and higher pressures.

Floating Ball Valve—A floating ball is not held in place by a trunnion, and instead is attached only to the stem. This causes the ball to float slightly downstream. It acts on the principle of pressure assisted seal where the line pressure leads to push the ball downstream causing to seal with the downstream seat.

One difficulty with ball valves arises with the need to replace components when the valve is in the pipeline. Those of skill in the art will appreciate the present invention that addresses this problem.

SUMMARY OF THE INVENTION

An object of the present invention is to provide a solution to the industry for replacing all the Ball Valve components and seals while the valve body is still in the pipeline.

Yet another possible object of the present invention is to provide an alternative for welded ball valves.

Another possible object of the present invention is to provide a ball remover that provides a camming action to allow a ball valve to be more easily removed.

Another possible object of the present invention is to provide a seat tool to release the spring tension on the seats so that they may be moved away from the valve centerline.

Yet still another object of the present invention is to provide a seat removal tool to move the seats towards the valve centerline after the ball valve has been removed so that the seat assemblies may be removed.

These and other objects, features, and advantages of the present invention will become clear from the figures and description given hereinafter. It is understood that objects listed above are not all inclusive and are only intended to aid in more quickly understanding the present invention, not to limit the bounds of the present invention in any way.

One general aspect comprises a top entry ball valve assembly for a ball valve mounted to a pipeline to control a flow of fluid through said pipeline. The top entry ball valve assembly also comprises a body defining a body cavity therein in which a ball is mounted, said body may comprise a body opening positioned at a top of said body through which said ball is mounted or removable from said body cavity when said ball valve is connected to said pipeline; said ball being rotatable between an open and a closed position when said ball is mounted within said body cavity; a seat member that forms a seal between said ball and said body; a cover plate mounted to a top portion of said body cavity, said cover plate being removable from said body to expose said body opening in said body; a valve operator to rotate said ball; and a cam mounted to said ball, said cam being moveable with rotation of said ball to a position to engage and urge said seat member away from a valve centerline.

Implementations may comprise one or more of the following features. The top entry ball valve assembly may comprise a seat stopping tool mountable to said body in a position to engage said seat member when said seat member is urged away from said valve centerline with said cam, where when said seat stopping tool is engaged with said seat member then said seat stopping tool prevents said seat member from moving toward a centerline of said ball. The top entry ball valve assembly may comprise a seat tool to release a spring, said spring being mounted to urge said seat member into engagement with said ball.

One general aspect comprises a top entry ball valve assembly for a ball valve mounted to a pipeline to control a flow of fluid through said pipeline. The top entry ball valve assembly also comprises a body defining a body cavity therein in which a ball is mounted, said body may comprise a body opening positioned at a top of said body through which said ball is mounted or removable from said body cavity when said ball valve is connected to said pipeline; said ball being rotatable between an open and a closed position when said ball is mounted within said body cavity; a seat member that forms a seal between said ball and said body; a cover plate mounted to a top portion of said body cavity, said cover plate being removable from said body to expose said body opening in said body; a valve operator to rotate said ball between said open or closed position; and a seat stopping tool mountable to said body in a position to engage said seat member, where when said seat stopping tool is mounted to said body then said seat stopping tool engages said seat member to prevent said seat member from moving toward a centerline of said ball.

Implementations may comprise one or more of the following features. The top entry ball valve assembly may comprise a cam mounted to said ball, said cam being moveable with rotation of said ball to a position to engage and urge said seat member away from said ball to thereby allow said seat stopping tool to be mounted to said body. The top entry ball valve assembly may comprise a seat tool to release a spring; said spring being mounted to urge said seat member into engagement with said ball, once said spring is released then said seat member is movable away from said ball in response to movement of said cam.

BRIEF DESCRIPTION OF THE DRAWINGS

The above general description and the following detailed description are merely illustrative of the generic invention Additional modes, advantages, and particulars of this invention will be readily suggested to those skilled in the art without departing from the spirit and the scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION

Detailed descriptions of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
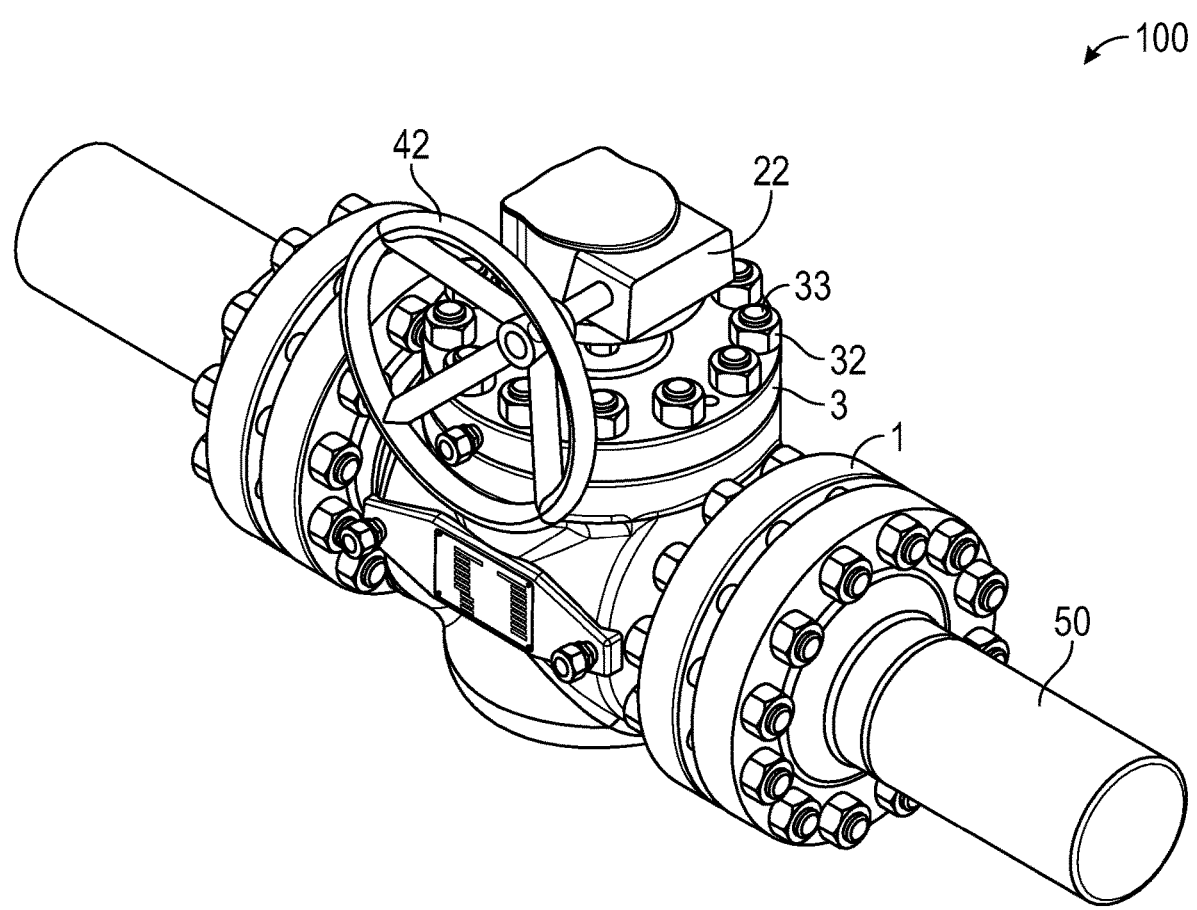
FIG. 1 is a perspective view of a top entry ball valve in operating condition installed in a pipeline in accord with one possible embodiment of the present invention.

Turning now to FIG. 1, a perspective view of a top entry ball valve 100 in operating condition installed in a pipeline is shown in accord with one possible embodiment of the present invention. The body 1, is installed inline attached to pipeline 50 allowing fluid flow through ball valve assembly 100. A gear box 22 may be equipped with a hand wheel 42 to the top of body 1. In this case, a hand wheel 42 and gear box 22 are used to operate the valve and the combination may be referred to as an operator. Or the hand wheel 42 by itself may be referred to as an operator. It will be understood that other operators such as a motor or handle or other suitable mechanical device can be used to rotate the ball 2 of the ball valve 100.

Fasteners such as nuts and studs 24, 25 may be used to attach the gearbox 22 to the body 1. After years of operation valve seals often need to be replaced. Therefore, maintenance or repairmen may be required to travel to a pipeline location to service a component. The requisite parts along with a list may be sent to assist the worker in order to complete work on the component. Prior art methods necessitated closing a section of pipe down, disassembling the component, sending the component often to be serviced, shipping the repaired component back to the location, and reinstallation. This, in turn, would lead to increases in down time, decrease production, increase costs, and increase wait times to return to operational status.

For repair of conventional ball valves, after closing the pipeline a repairable ball valve needs to be removed from the pipeline. A repairable ball valve needs to be sent to the factory for dismantling and replacing the seals. The repaired ball valve then needs to be sent back to the pipeline for re-installing back into the pipeline. These steps involve a substantial amount of time and cost.

A top entry ball valve such as the current invention will allow the reduction of downtime and cost by allowing the components and seals to be replaced while the valve body is still connected to the pipeline.

Ball valve assembly 100 comprises an apparatus and method which allows for the disassembly and reinstallation of a top entry ball valve while maintaining the ball valve in operating condition. The following illustrates the stages of disassembling the complete valve while the body 1 is still installed in the pipeline.

Figure 2:
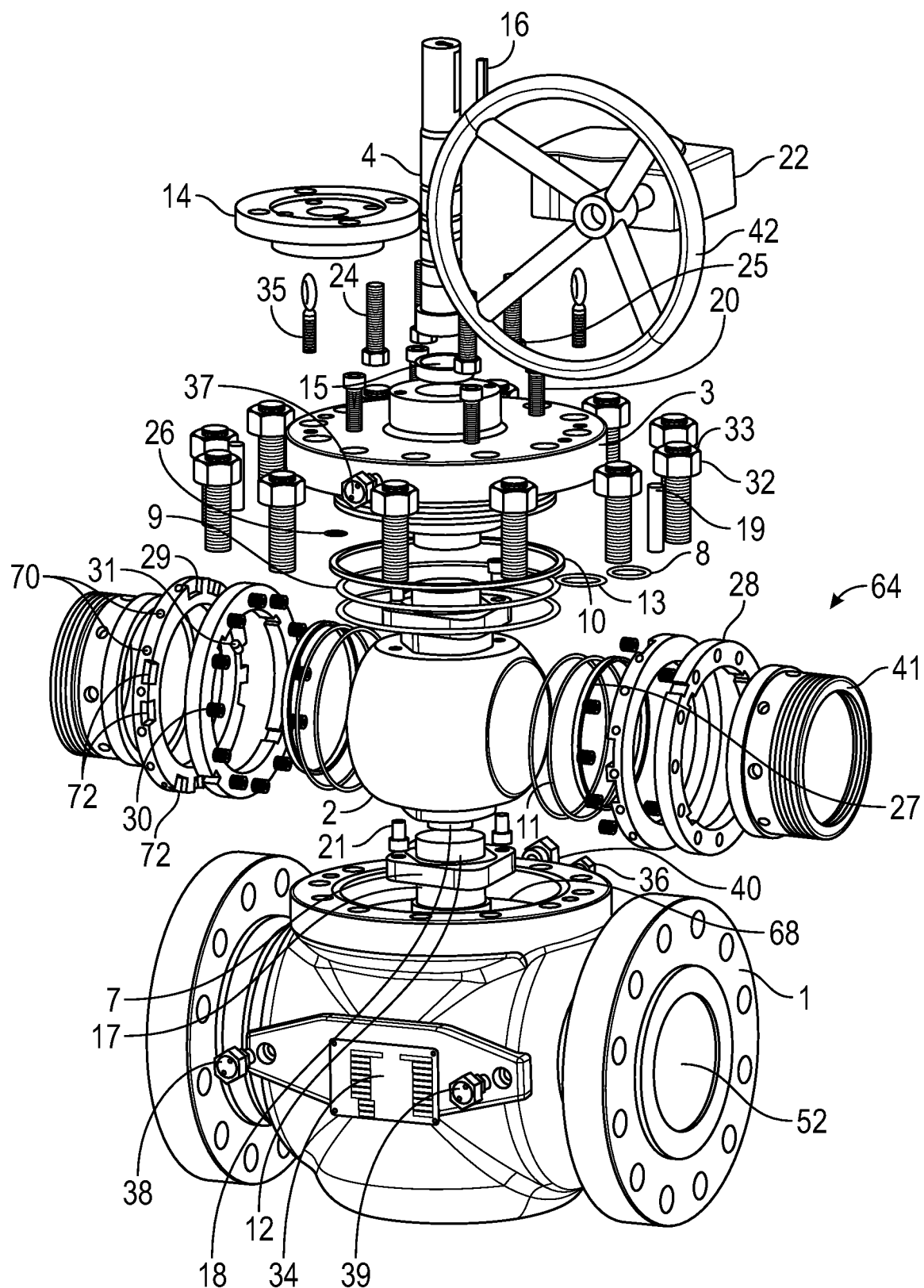
FIG. 2 is an exploded plan view, in isometric 3D, of a top entry ball valve assembly in accord with one possible embodiment of the present invention.

Referring to FIG. 2, an exploded plan view, in isometric 3D, is shown of a top entry ball valve assembly in accord with one possible embodiment of the present invention. A top entry ball valve comprises a plurality of pieces. Disassembly and reassembly of the valve while still installed in the pipeline is quite advantageous. The ball valve assembly 100 comprises four main components: the body 1, gearbox 22, ball 2, and seat assembly 64. The body 1 defines a throughbore 52 therethrough in which fluid flows from pipeline 50.

The gearbox 22 may be equipped with a handwheel 42 to allow opening and closing of the valve. A stem 4 may be attached from the gearbox to the ball 2 to allow rotation of the ball 2.

Below the gearbox may be a gland plate 14 where the gear box is secured through use of studs and nuts 24, 25. A key 16 may also be inserted. The stem 4 is inserted through the gland plate 14 and cover 3 and secured in a slot at the top of the ball 2. Cover 3 may also be referred to as cover plate 3 in the specification and/or claims. Cover 3 is located at a "top" or "top portion" of the valve as viewed in the drawings. The cover plate 3 is operable to seal body opening 68 (see for example FIG. 2, FIG. 7A, or FIG. 7B at the top of ball valve 100). The valve is generally installed in the pipeline with the "top" or "top portion" as shown in the drawings pointed upwardly or at the top of the valve with installed in the pipeline. Gland plate 14 is further secured to cover 3 with screws 20. Seal or pip 15 seals between the stem 4 and cover 3.

A plurality of nuts and studs 32, 33 may be fastened along the circumference of the cover 3 which has holes to allow the nuts and studs 32, 33 to pass through and be inserted into corresponding holes in the body thereby securing the cover to the body 1. The cover 3 may also have a grease fitting 37 secured to the side. A plurality of seals, washers, springs, and the like may be used with top cover 3 such as stem seal 8, stem washer 13, cover gasket 10, anti-static springs 26, cover seal 9, and dowel pins 19.

Ball valve assembly 100 may comprise two seat assemblies 64. The seat assembly 64 may comprise seat carrier 41, seat carrier spring holders 28, seat carrier spring compressor 29, seat insert 27, springs 30, pins 31, and seats seals 11. The seats are positioned on either side of ball 2 to provide sealing of fluid between the body and the ball. While a specific seat assembly 64 is described, a spring or springs may be used to urge seat members that may be of various types against the ball to for a seal.

In one embodiment, the ball 2 may be inserted into the top of the body 1 or also called a top entry ball valve. The ball 2 may be placed on a lower trunnion 17 which acts as a pin or pivot on which the ball can be rotated or tilted. The trunnion 17 may be inserted into ball remover 7. Below the ball may also be sleeve bearing 12, ferry head bolts 21, and bearing 18. During assembly and disassembly, eye bolts 35 may be inserted into the top of ball 2 to allow for lifting and lowering of the ball 2 into and out of the body 1.

Body 1 comprises flanges on either side to attach to a pipeline for operation. At the top is an opening 68 whereby the ball 2 may be inserted. The ball 2 is rotated to either open or close the fluid flow through the valve. Seats are placed within the body on either side of the ball to act as a seal between the body and the ball. The body may further comprise drain plug 36, vent fitting 40, name plate 34, and grease fittings 38, 39.

Figure 3:
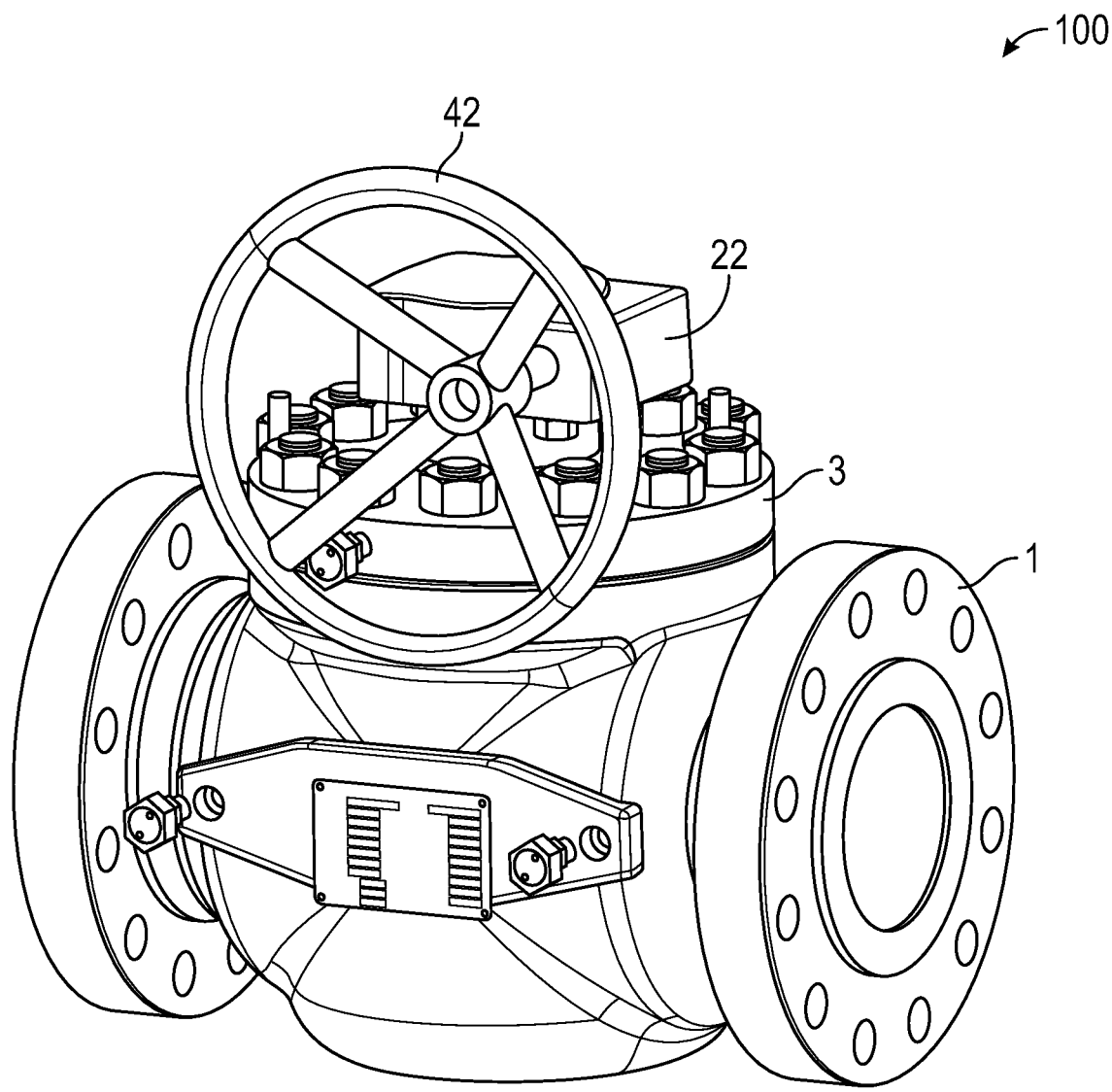
FIG. 3 is a perspective view a top entry ball valve with gear box installed in accord with one possible embodiment of the present invention.
Figure 4:
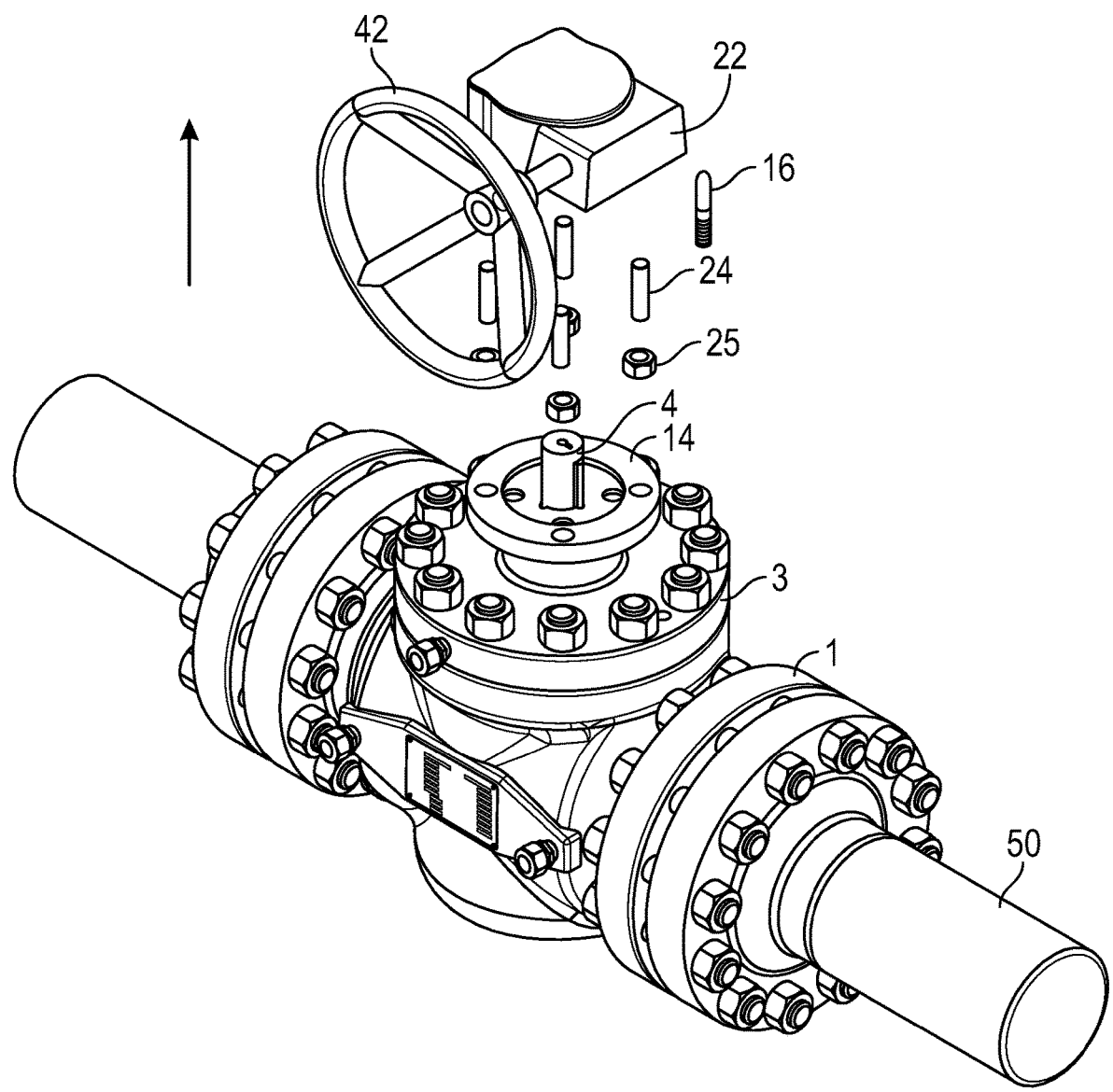
FIG. 4 is a perspective view showing the dismantling of a gear box from a top entry ball valve in accord with one possible embodiment of the present invention.
Figure 5:
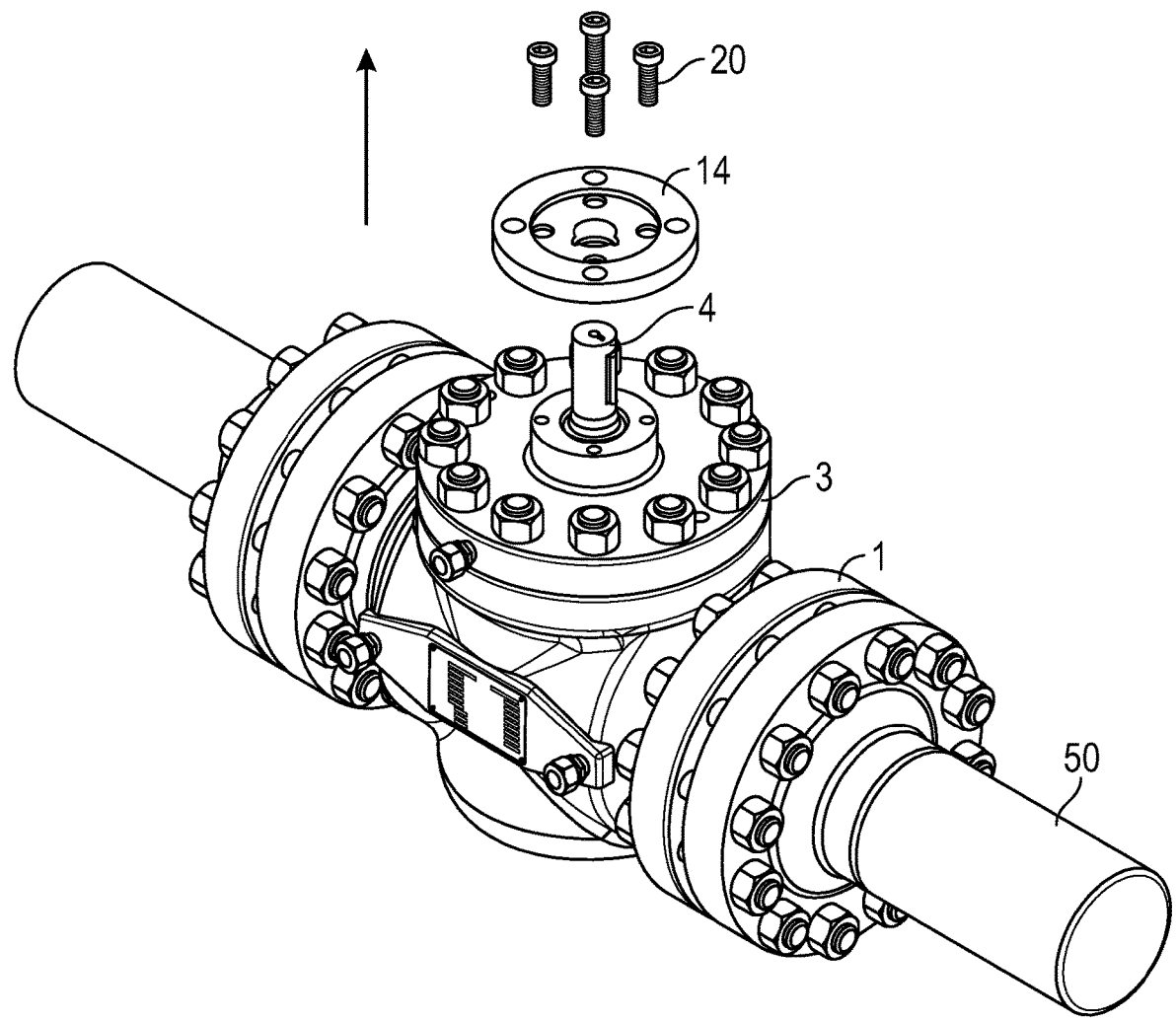
FIG. 5 is a perspective view showing the dismantling of a gland plate from a top entry ball valve in accord with one possible embodiment of the present invention.

Turning to FIGS. 3-6, the initial steps of disassembling the ball valve assembly 100 are shown. A fully assembled ball valve assembly 100 is shown in FIG. 3. It will be noted that the valve operator, in this case wheel 42 and gearbox 22 are mounted in an "operating position" to rotate the ball between an open and closed position. In the operating position, the shaft of handle 42 is orthogonal to the pipeline or flowline through the valve body 1. More specifically, the operating position is the position in which the valve operator, in this case the handle 42 and gearbox 22, is mounted to the pipeline for normal operation of the valve to open and close the valve to control fluid flow through the pipeline. The "valve operator" is the mechanism that operates the valve ball, i.e. to turn the ball one-quarter turn to open and close the valve. The term "operating position" is also important because the method of replacement of seals requires mounting the operator at a different position than would be used for controlling fluid flow through the pipeline. The "operating position" shown in FIG. 3 of the operator is different from the "rotated position" of FIG. 12A, FIG. 13 which assembly is part of the novel method of the present invention as discussed hereinafter. The terms "operating position" and "rotated position" are used herein to explain steps in the novel method of the present invention.

As shown in FIG. 1 and FIG. 3, the gear box 22 with wheel 42 are mounted to the cover 3 and secured to body 1 in the operating position, which is the normal position for operations which may involve opening and closing the valve 100 to control fluid flow through the pipeline. The initial step in the method requires that the gearbox 22 must then be first disassembled. A wrench or spanner may be utilized to loosen studs and nuts 24, 25 from gland plate 14 thereby allowing the gearbox 22 to be removed. The gland plate 14 is then removed by first loosening screws 20 and lifting the gland plate off and over the top of stem 4 and cover 3. A plurality of fasteners or nuts 32 are then loosened allowing the cover to lifted off the top of the body 1. Along with the cover 3, cover gasket 10 and cover seal 9 are carefully removed exposing the stem 4. The stem 4, dowel pins 19, key 16, and seal pip may then also be removed from the ball 2 and body 1. This process then allows a user access to the seat inserts 27 and ball 2.

Figure 7A:
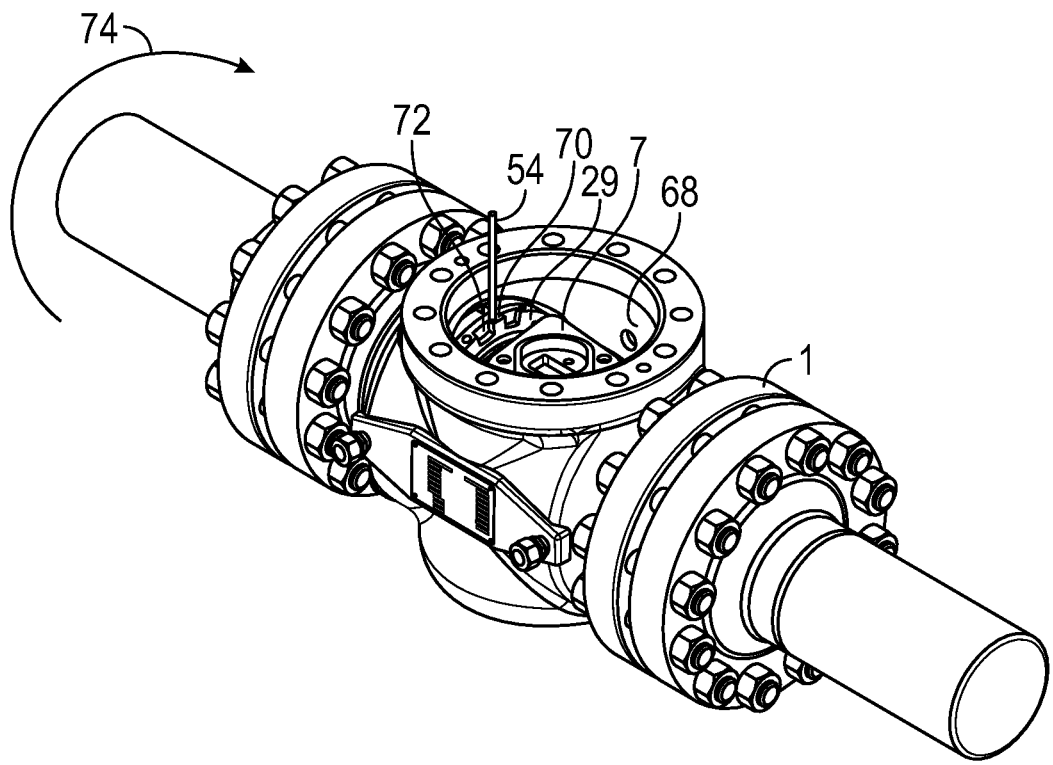
FIG. 7A is a perspective view showing the dismantling of a seat carrier spring compressor and holder from a top entry ball valve in accord with one possible embodiment of the present invention.
Figure 7B:
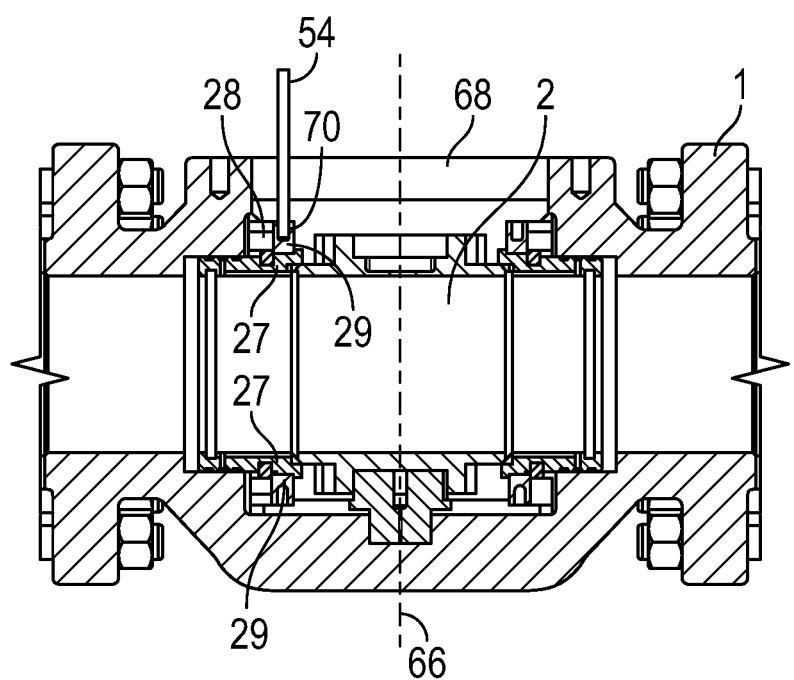
FIG. 7B is a side elevational view showing the dismantling of a seat carrier spring compressor and holder from a top entry ball valve in accord with one possible embodiment of the present invention.
Figure 8:
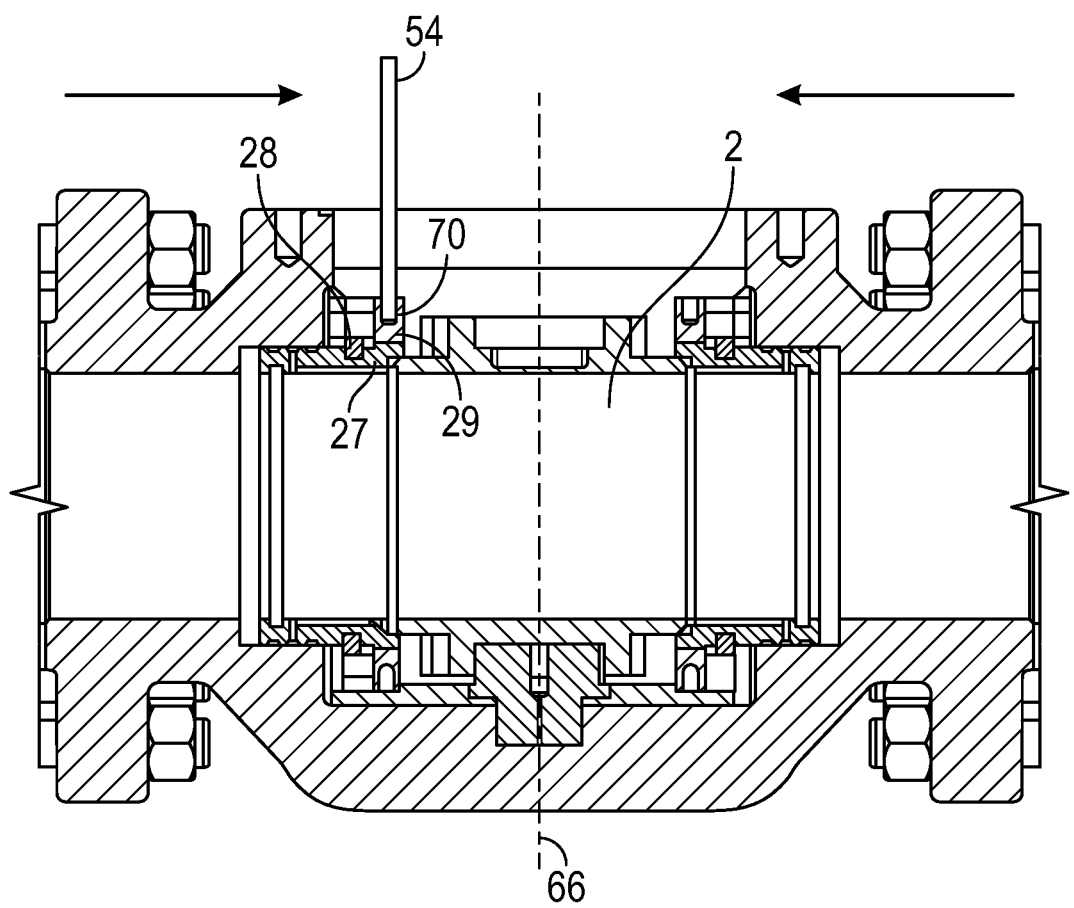
FIG. 8 is a side view showing the dismantling of a seat carrier spring compressor and holder from a top entry ball valve in accord with one possible embodiment of the present invention.

Turning to FIGS. 7A-B and 8, a plan view in perspective and side view show the dismantling of a seat assembly 64 (which may also be referred to herein as a seat) from a top entry ball valve in accord with one possible embodiment of the present invention. The seat assembly 64 is dismantled first using seat tool 54. Seat tool 54 may comprise a thin rod that may slidingly engage into a reciprocally shaped receptacle 70 formed within the top of seat carrier spring compressor 29. Receptacle 70 may be positioned between recesses 72 on the seat carrier spring compressor 29. In one possible embodiment, there may be threads on the interface between the spring compressor and the seat carrier 41. Springs 30 are located behind the seat carrier spring holder 28 pushing the seat assembly 64 towards the ball 2 to thereby urge seat assembly 64 into engagement with ball 2 using the spring pressure thereof. Seat tool 54 is rotated as indicated by the arrow 74 in FIG. 7A to disengage the seat carrier spring compressor and seat carrier spring holder 28. Arrow 74 could also be arc shaped to indicate the rotation of seat carrier spring compressor 29 within the valve for releasing the seats to be removed for replacement. There are multiple holes or receptacles 70 on the periphery of seat carrier spring compressor 29 (see also multiple holes 70 in FIG. 2) whereupon tool 54 can be repeatedly inserted/removed from holes 70 allowing a partial rotation with each insertion/removal of seat tool 54. Seat tool 54 may simply be a rod or cylinder that fits into holes 70 for rotation of the seat carrier spring compressor 29. Seat tool 54 is inserted into a slot or receptacle 70 at the top of seat carrier spring compressor 29. The tool 54 can then be rotated to in turn move the seat carrier spring compressor and seat carrier spring holder. As seen best in FIG. 7B, the seat carrier spring compressor and seat carrier spring holder are fully inserted to the outermost position and in communication with body 1.

In FIG. 8, the spring compressor and spring holder 28 are pushed ahead towards the valve centerline 66 after loosening the threads using seat tool 54. Rotating the seat spring compressor using seat tool 54 will relieve the spring force. Once the spring force is relieved, the seat assembly 64 is free to be pushed away from the valve centerline 66. As can be seen when compared to FIG. 7B, seat carrier spring holder 28 and spring compressor 29 has been moved towards the valve centerline 66.

Figure 6:
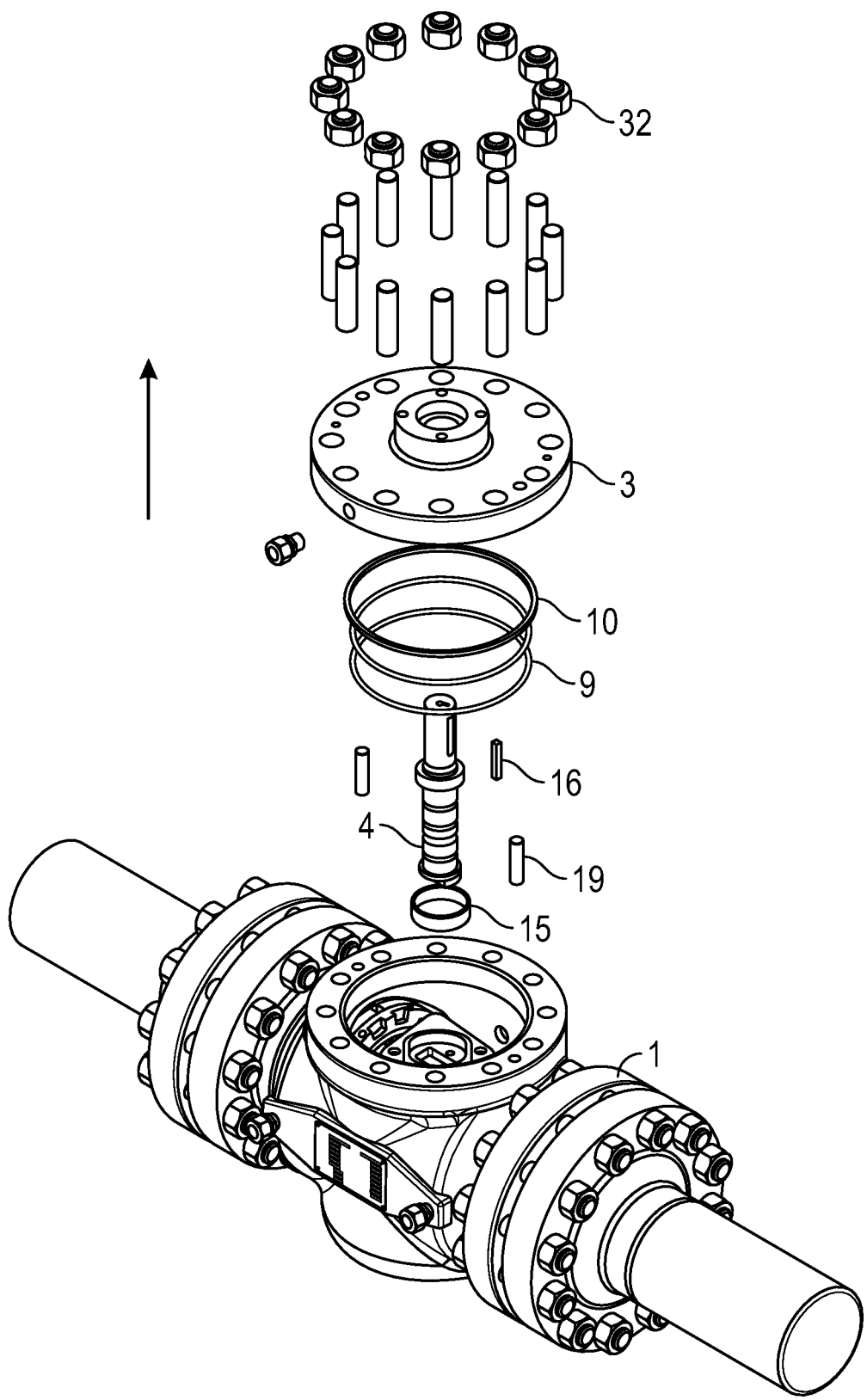
FIG. 6 is a perspective view showing the dismantling of a cover, stem and seals from a top entry ball valve in accord with one possible embodiment of the present invention.
Figure 9:
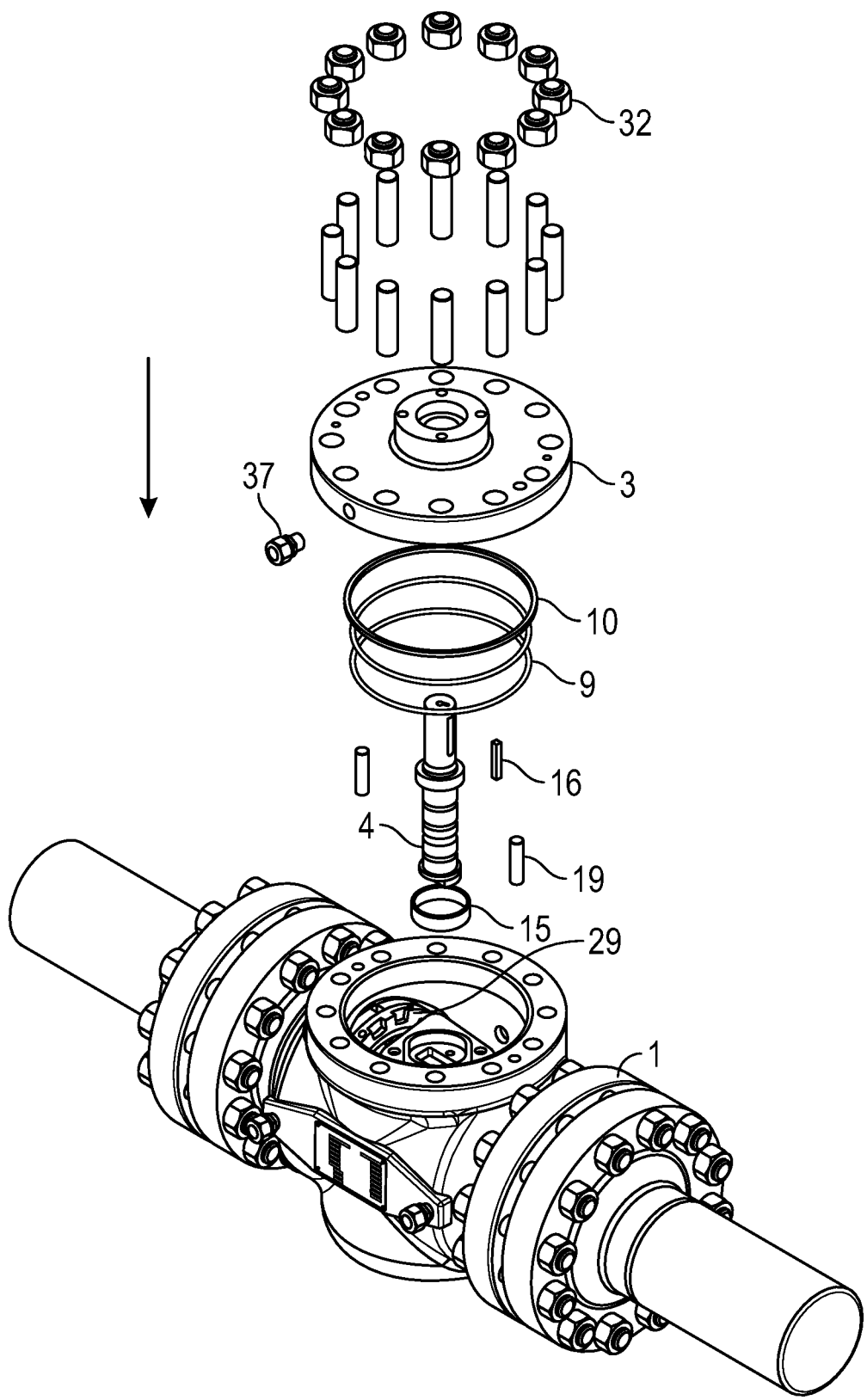
FIG. 9 is a perspective view showing the reassembling of a cover and seals from a top entry ball valve in accord with one possible embodiment of the present invention.

Turning to FIG. 9, the ball valve 100 is reassembled by the reverse order of FIG. 6. Seal pip 15 is reinstalled into cover 3 along with stem 4, dowel pins 19 and key 16. Cover seal 9 and cover gasket 10 are replaced prior to reinstalling cover 3. Cover 3 is then secured using nuts or fasteners 32.

Figure 10A:
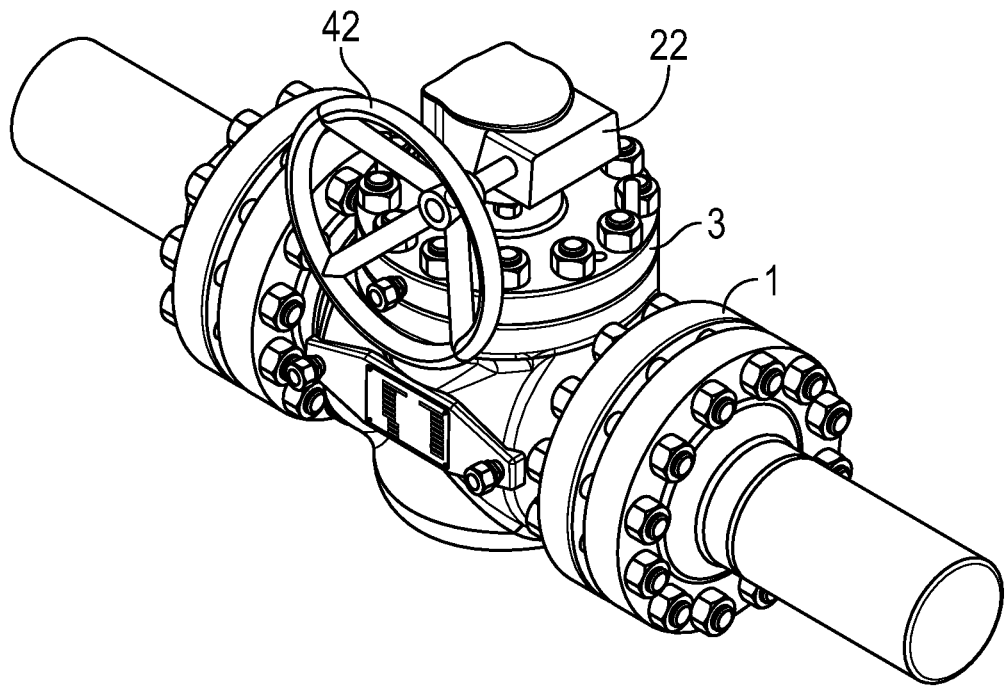
FIG. 10A is a perspective view showing the reassembling of a gearbox from a top entry ball valve in accord with one possible embodiment of the present invention.
Figure 10B:
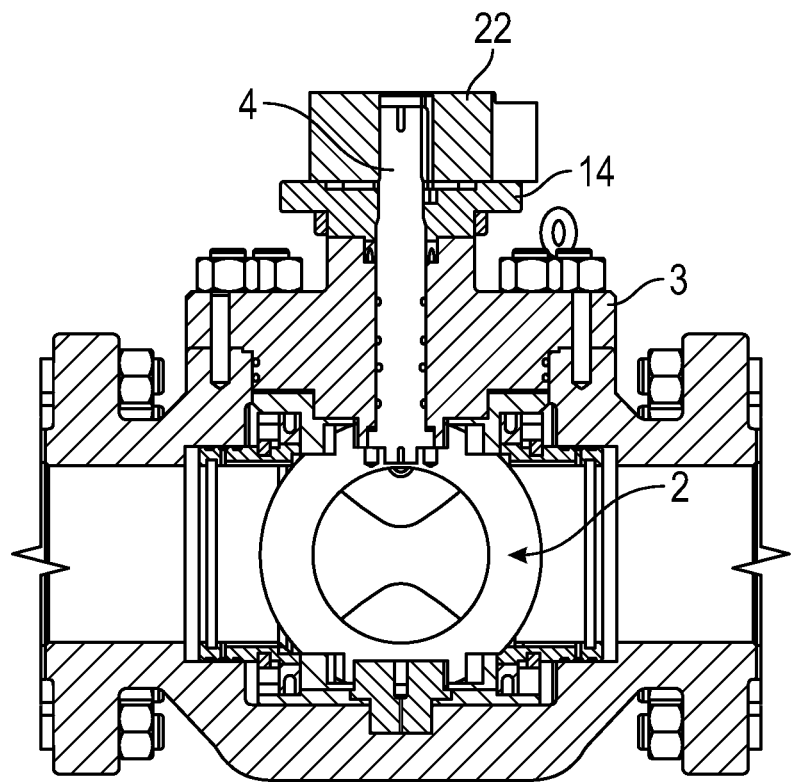
FIG. 10B is a side view showing the reassembled gear box assembly with ball rotated by ninety degrees to a closed position from a top entry ball valve in accord with one possible embodiment of the present invention.

Referring to FIGS. 10A and 10B, the gearbox 22 is also reinstalled. It will be noted that the gear box 22 and hand wheel 42 are in what may be referred to as an operating position or standard position used during operations whereby the shaft of hand wheel 42 is 90 degrees to the pipeline. After reassembly, the valve is turned by operating the hand wheel 42 and gearbox 22 to bring the ball 2 to the closed position. Ball 2 is shown in the closed position or 90 degree closed position.

Figure 11:
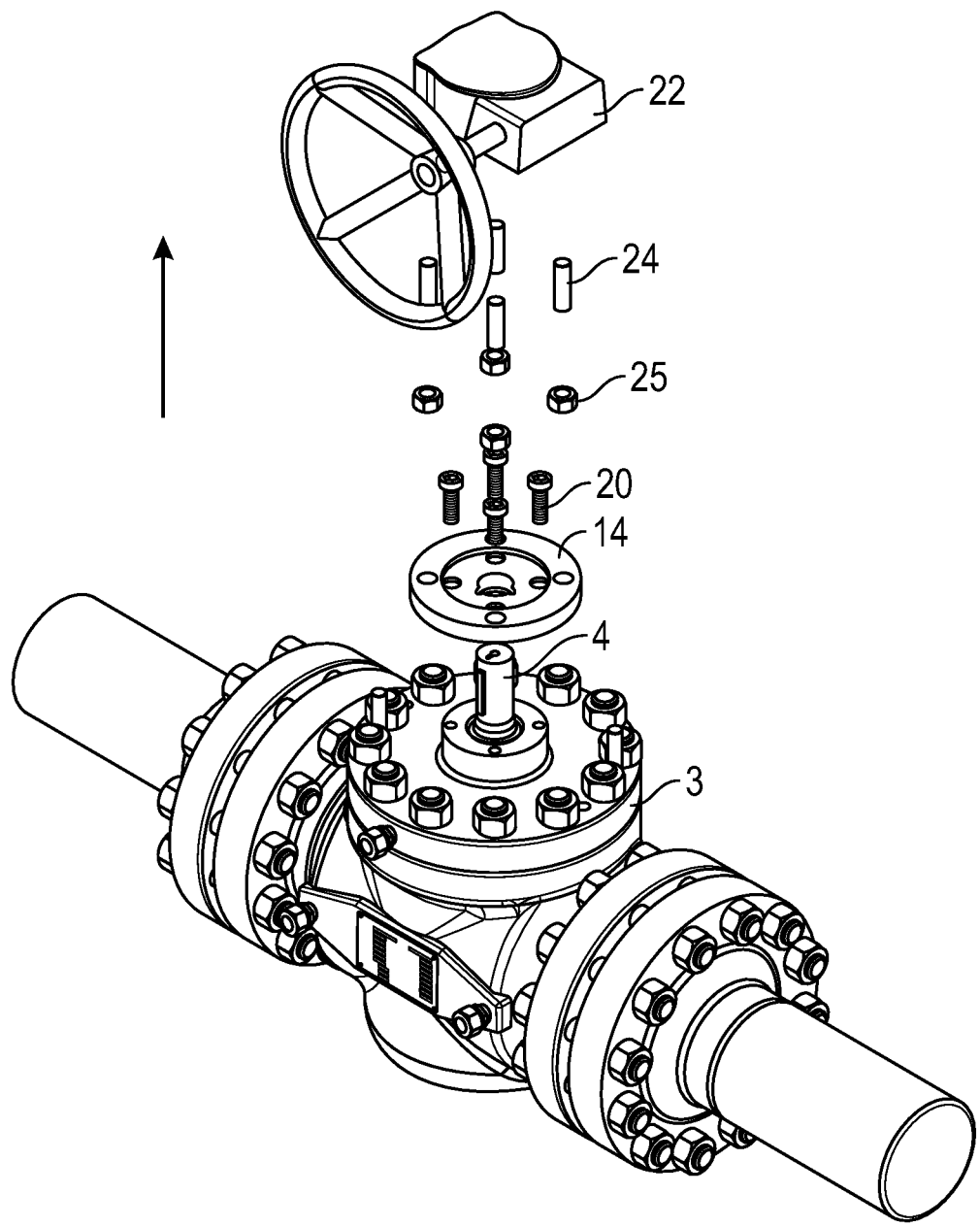
FIG. 11 is a perspective view of disassembling of a gear box assembly and gland plate from a top entry ball valve in accord with one possible embodiment of the present invention.
Figure 12A:
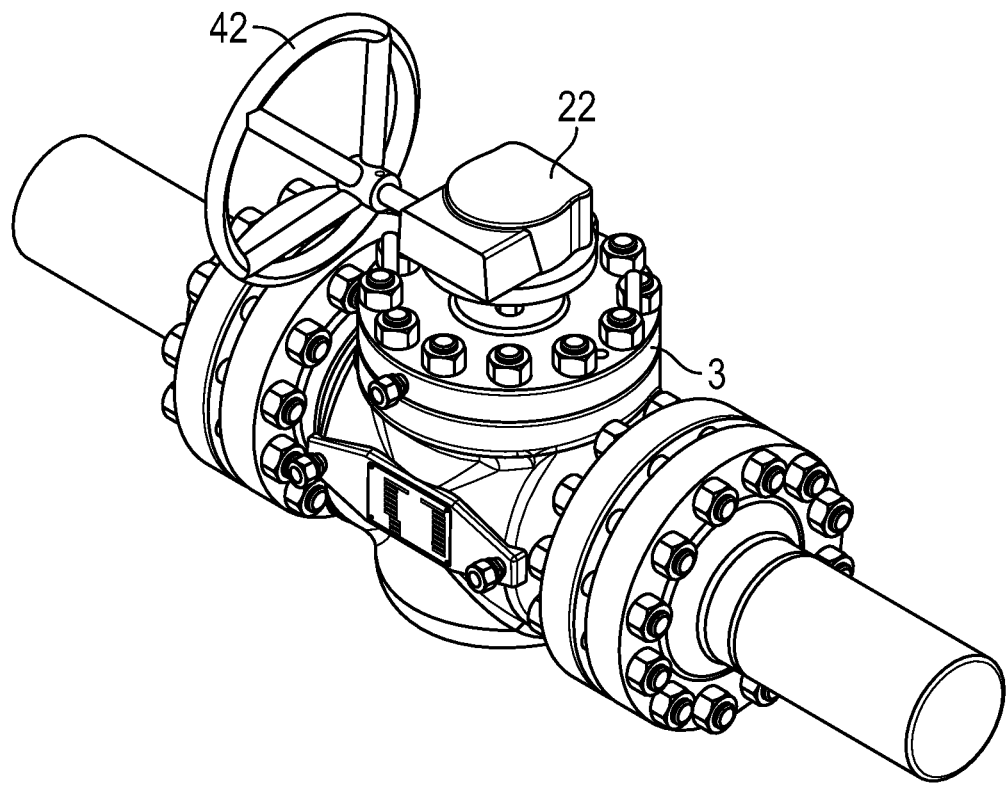
FIG. 12A is a perspective view of assembled gland plate and gear box assembly after a 90° rotation from a top entry ball valve in accord with one possible embodiment of the present invention.
Figure 12B:
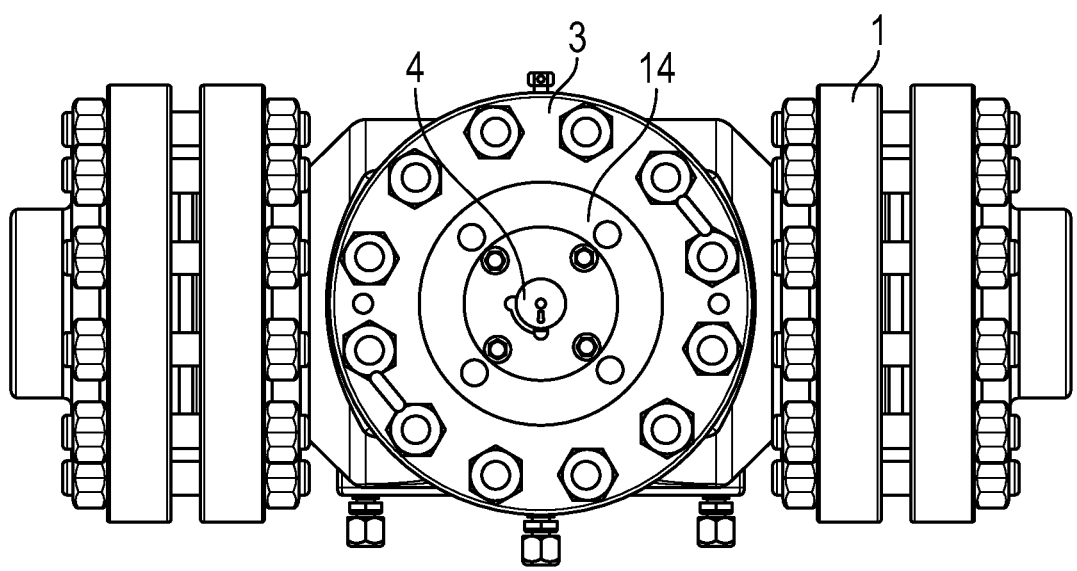
FIG. 12B is a top view of ball valve without gear box assembly and gland plate assembled in a 90° rotated position from a top entry ball valve in accord with one possible embodiment of the present invention.
Figure 13:
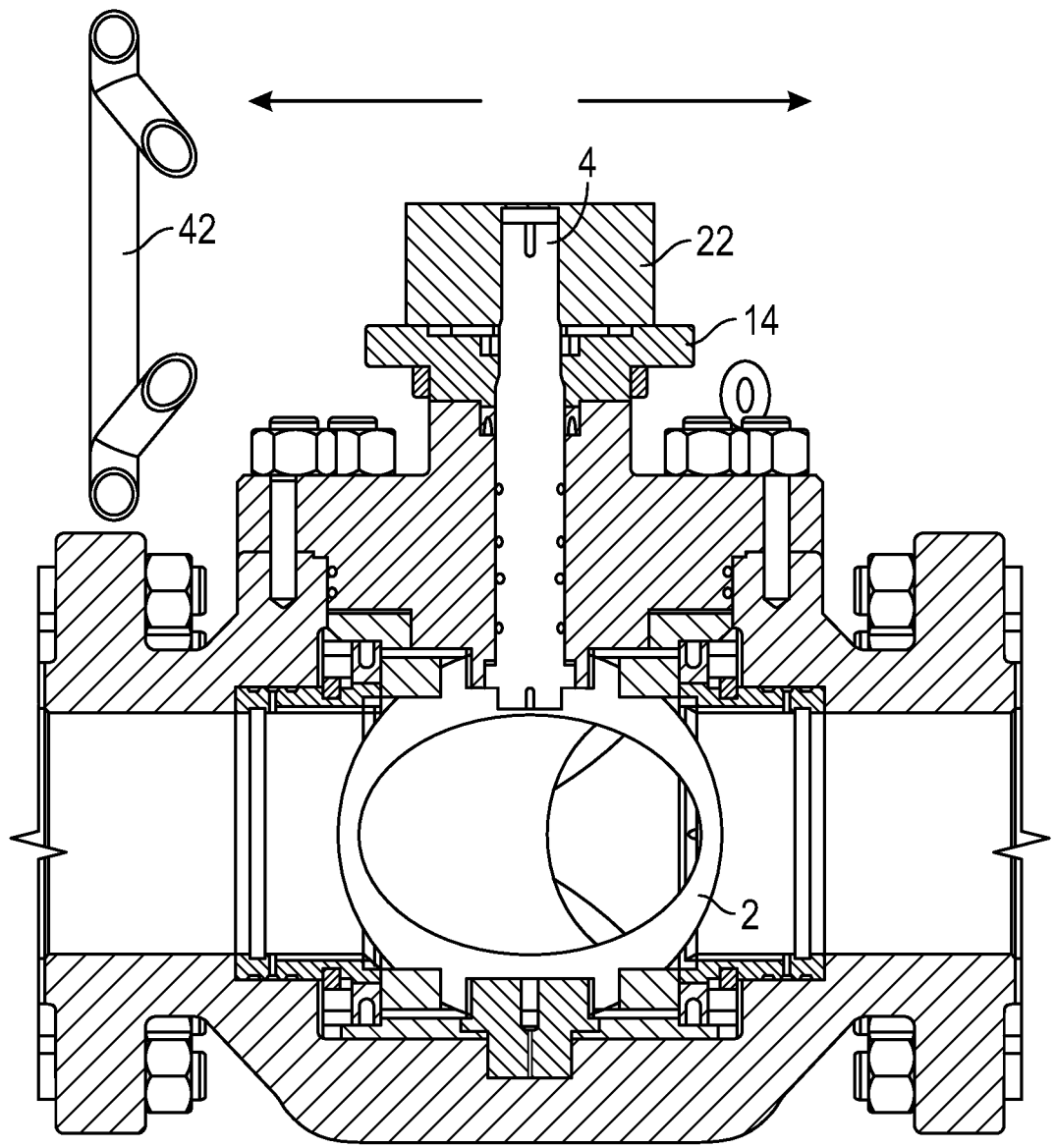
FIG. 13 is a side view in section of a ball remover after rotating ball by 45° and seat assemblies moved away from valve centerline due to ball remover cam action from a top entry ball valve in accord with one possible embodiment of the present invention.

In FIGS. 11-13, the gearbox 22 is again dismantled from the cover 3 by loosening studs and nuts 24, 25. The gland plate 14 is again removed by loosening screws 20. After the gearbox 22, handwheel 42, and gland plate 14 are removed, they are rotated by 90 degrees and reinstalled onto the valve in the 90 degree rotation in a position rotated 90 degrees from the operating position as shown in FIG. 12A. With the gearbox and wheel, i.e. the operator, are in this 90 degree rotated position, the valve is further rotated past the closed position by an additional 45 degrees (135 degrees in total). Thus with the operator in the rotated position, the additional available rotation for the operator allows the user to use the operator to cause the ball 2 and ball remover 7 mounted on the top and bottom sides of the ball, or cam 79 on the ball removers to rotate one hundred thirty five degrees with respect to the valve closed position to push the seat or seat members or seat elements away from the valve centerline 66. It will be noted in FIG. 2 that two ball removers 7 are utilized above and below the ball and preferably act in concert. The ball remover(s) 7 acts as a cam action when rotated by 135 degrees. See FIG. 22A that shows the ball remover 7. The ball remover 7 is generally square but comprises rounded corners 79 so that one of the rounded corners 79 of the ball remover acts as what may be called cam 79 to push the seats away. Other configurations could be utilized but the result is that a cam is mounted to the ball to engage one or more of the seats 27, seat carrier spring holders 28, and seat carrier 29 using a valve operator, which in this case is the wheel 42 and/or gear box 22. It will be appreciated that the seat assembly 64 having components 27, 28, 29 may be in various forms so that they either comprise the total seat assembly or part of the seat assembly 64, or other types of seats may be referred to in the claims as a seat member which is moved by a cam. The explanation herein is provided for a specific design seat assembly 27-29 and a specific cam that is provided on what is called a ball remover 7. The cam could be mounted differently to the ball 2, and could be shaped differently to rotate with the ball 2, to thereby engage whatever seat or seat assembly that is used. Thus, seat member(s) refers to any seal(s) used to produce an upstream and/or downstream seal with the ball around the flow passageway through the valve to prevent leakage when the ball is in the open or closed position. In other words the "seat member," which may be in the form of one or more or all of seat assembly 64 with seat insert 27, spring holder 28, seat compressor 29, or other seat configurations engages the ball and forms a seal with the ball. A single seat member might be utilized or a set of seat members on opposite sides of the ball may be utilized.

Figure 14A:
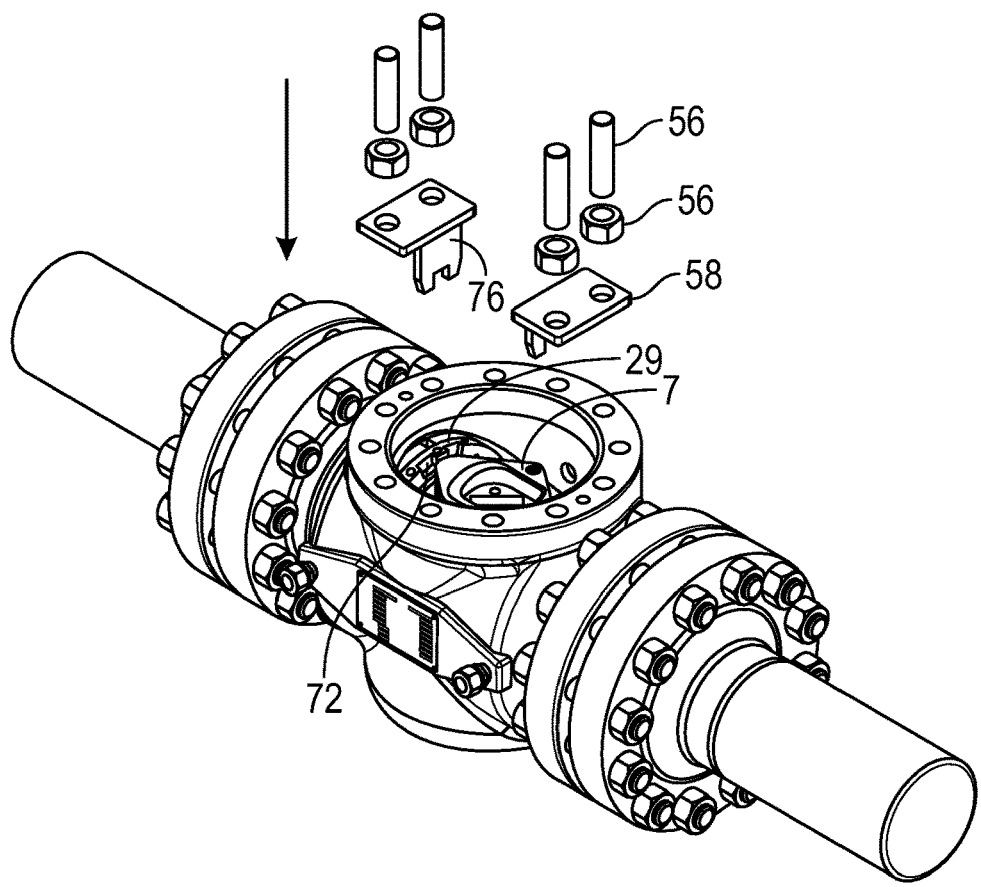
FIG. 14A is a perspective view of a top entry ball valve with seat stopping tool in accord with one possible embodiment of the present invention.
Figure 14B:
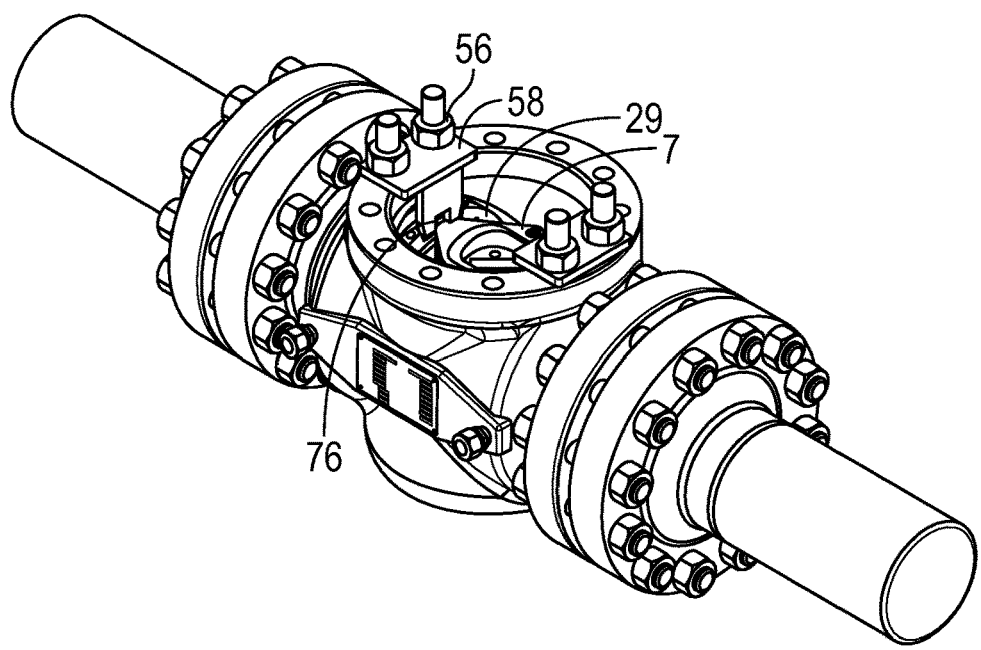
FIG. 14B is a perspective view of a top entry ball valve with seat stopping tool in accord with one possible embodiment of the present invention.

Referring now to FIGS. 14A-19B, gearbox 22, gland plate 14, and cover 3 are removed to allow access inside the body cavity. As shown in FIGS. 14A and 14B, seat stopping tools 58 are inserted and secured to the top of the body 1 using fasteners 56. The seat stopping tools 58 are comprised of metal and have a 90 degree angle to allow them to be secured to the top of the body as well as in communication with seat carrier spring compressor 29. Seat stopping tool 58 has prongs 76 which are operable to be inserted into corresponding slots or recesses 72 at the top of seat carrier spring compressor 29. Recesses 72 are also shown in FIG. 2. Therefore, seat stopper tool 58 acts as a stopper or lock for the seat assembly 64 thereby preventing the seat assembly 64 from moving towards the valve centerline due to the force from springs 30. However, seat stopping tool 58 could be any shape that prevents the seats from expanding inwardly towards the centerline, whereby the ball 2 (see FIG. 2) can be removed.

Figure 15A:
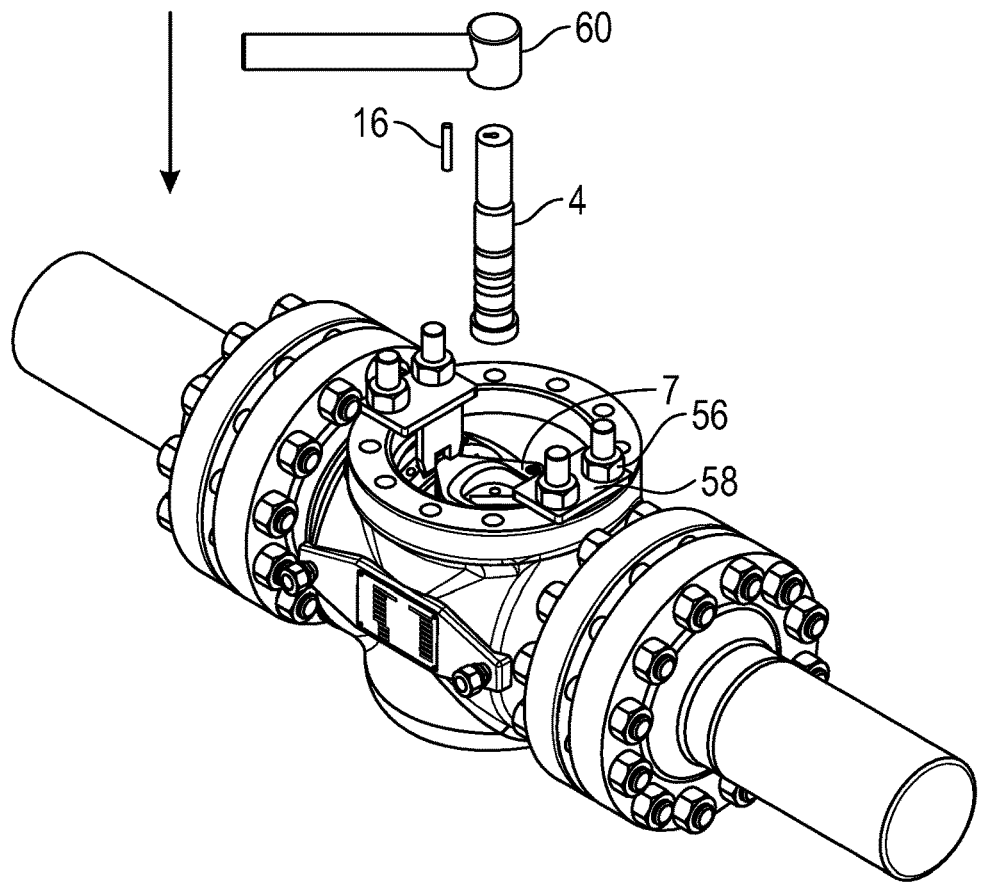
FIG. 15A is a perspective view of a top entry ball valve with wrench assembly tool in accord with one possible embodiment of the present invention.
Figure 15B:
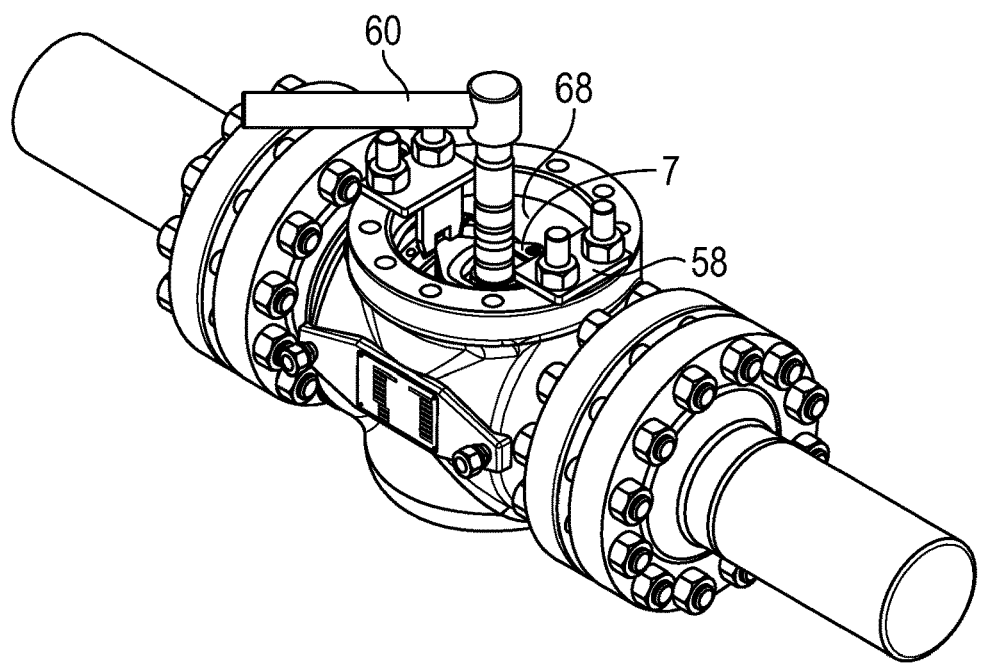
FIG. 15B is a perspective view of a top entry ball valve with wrench assembly tool in accord with one possible embodiment of the present invention.
Figure 16A:
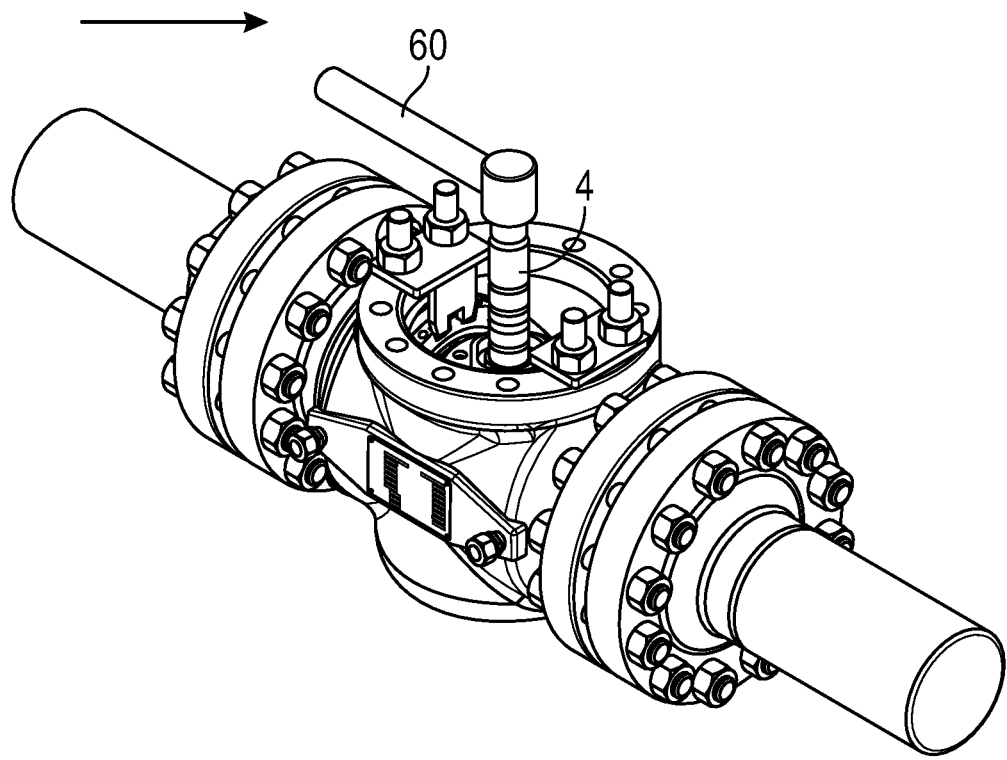
FIG. 16A is a perspective view of a top entry ball valve with wrench assembly tool in accord with one possible embodiment of the present invention.
Figure 16B:
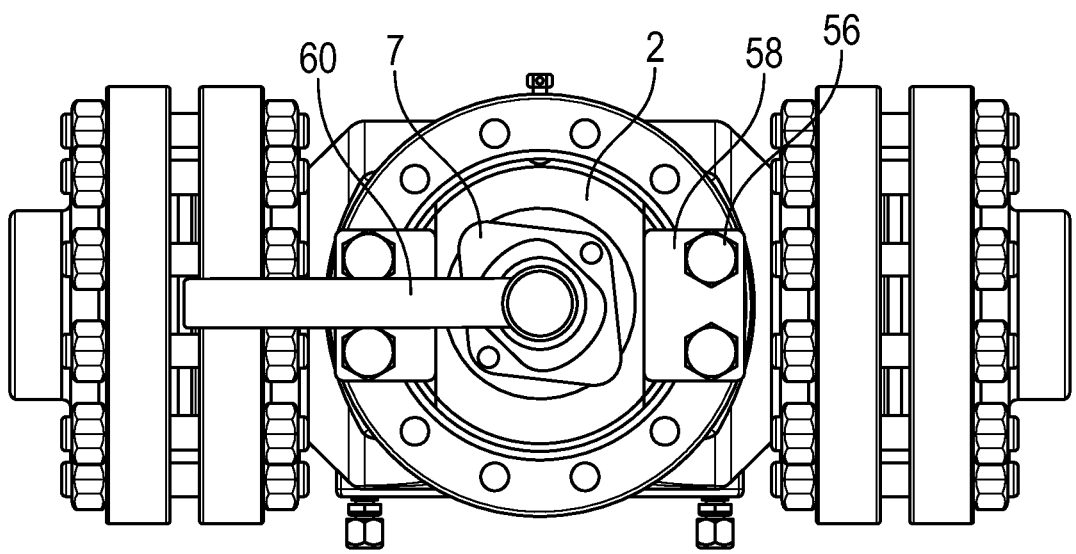
FIG. 16B is a top view of a top entry ball valve with wrench assembly tool in accord with one possible embodiment of the present invention.

After the seats are locked in place, the stem 4 and stem wrench 60 are reinstalled into the ball 2 by lowering them onto the top of ball 2 as shown in FIG. 15A. Stem wrench 60 is used to bring the valve to the open position as indicated in FIG. 15B, FIG. 16A and FIG. 16B. The stem wrench 60 is connected at the top of the stem 4 and operable to rotate the stem 4 and in turn rotate ball 2. Once the ball 2 is in the open position there is clearance between the ball 2 and the assembly 64. Accordingly, seat stopping tool 58 holds the seat assembly 64 in position. Due to this, the ball 2 is in a free position and able to be picked up or lifted and removed outside of the valve body 1.

Figure 17A:
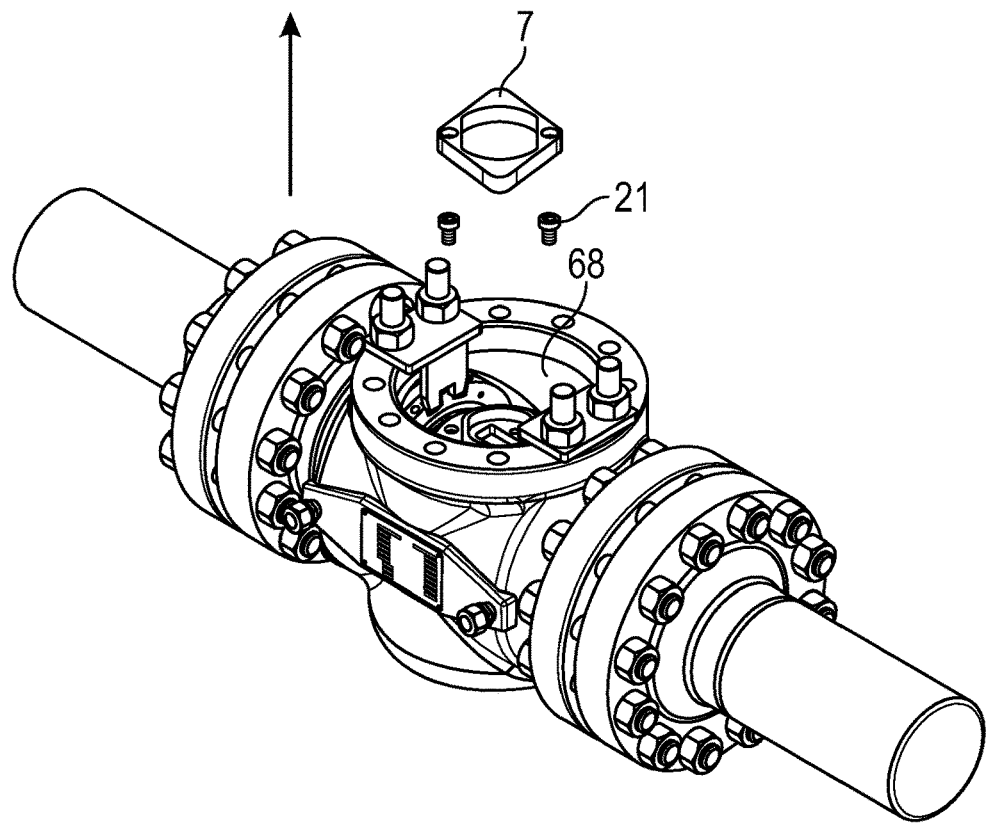
FIG. 17A is a perspective view of a top entry ball valve with ball remover in accord with one possible embodiment of the present invention.
Figure 17B:
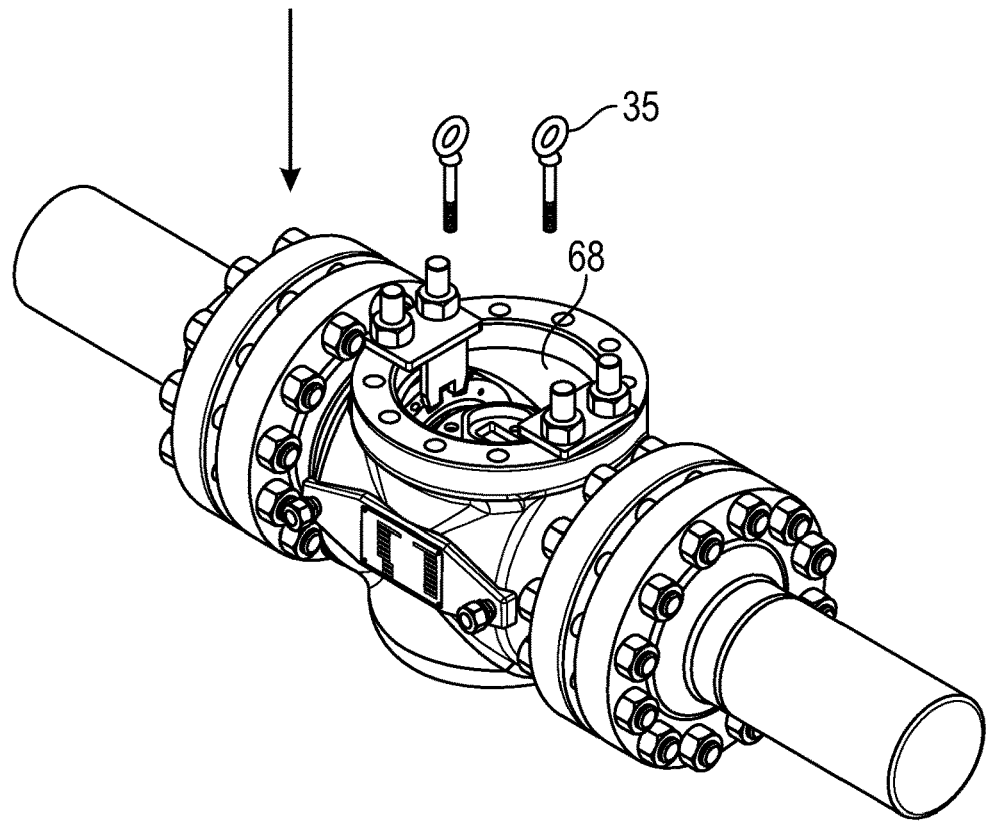
FIG. 17B is a perspective view of a top entry ball valve with ball and ball remover disassembled in accord with one possible embodiment of the present invention.

The stem wrench 60 and stem 4 are removed as shown in FIG. 17A. Ball remover 7 is then also removed by loosening ferry head bolts 21 and lifting ball remover 7 from the body 1 through opening 68 at the top of the ball valve 100. Eye bolts 35 may then be inserted into the top of the ball 2 as shown in FIG. 17B. The eye bolts 35 are installed so that the ball 2 may be lifted out of the body 1 such as by a hoist, winch, or the like.

Figure 18A:
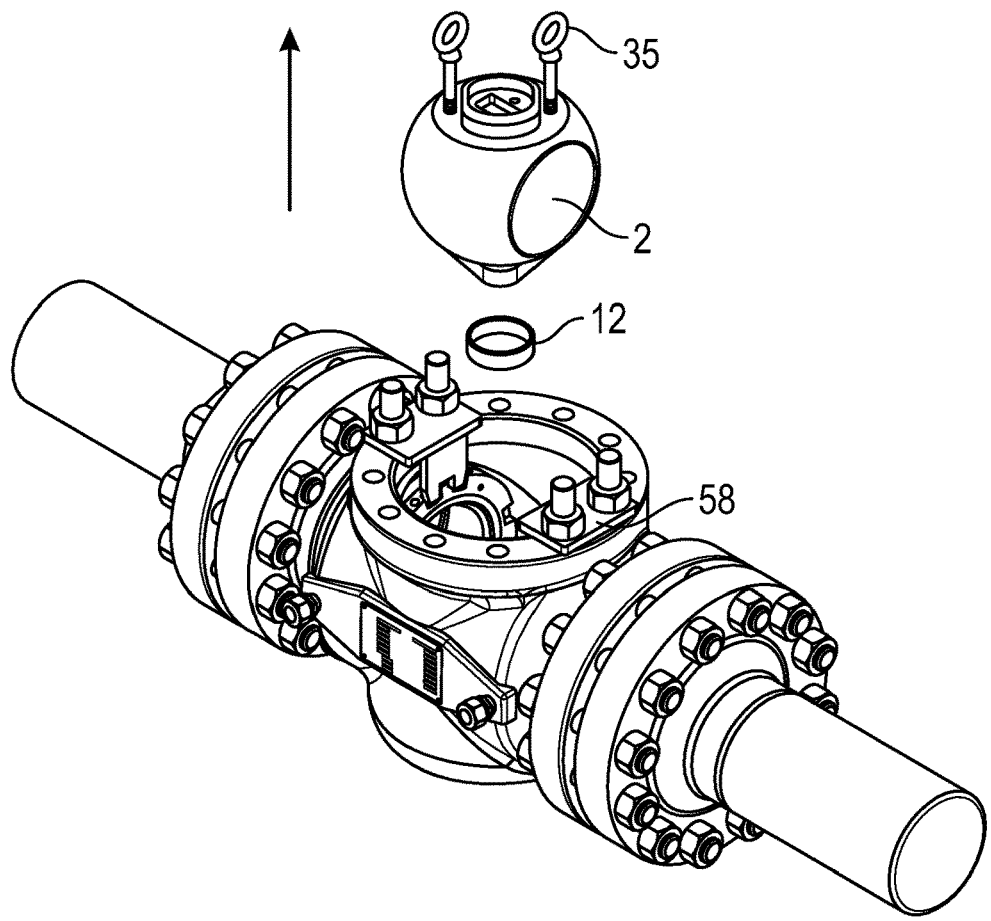
FIG. 18A is a perspective view of a top entry ball valve with ball remover in accord with one possible embodiment of the present invention.
Figure 18B:
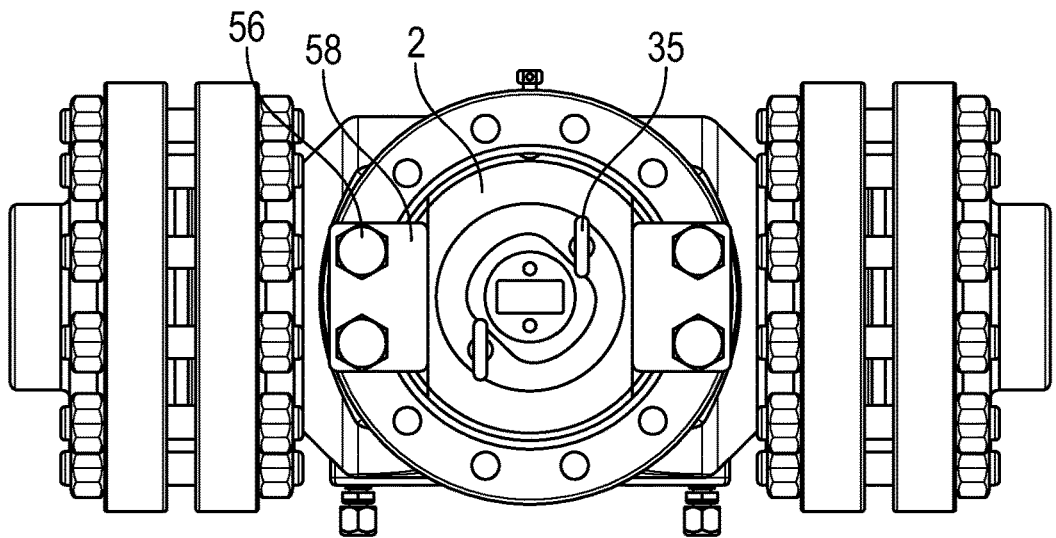
FIG. 18B is a top view of a top entry ball valve with ball remover in accord with one possible embodiment of the present invention.
Figure 19A:
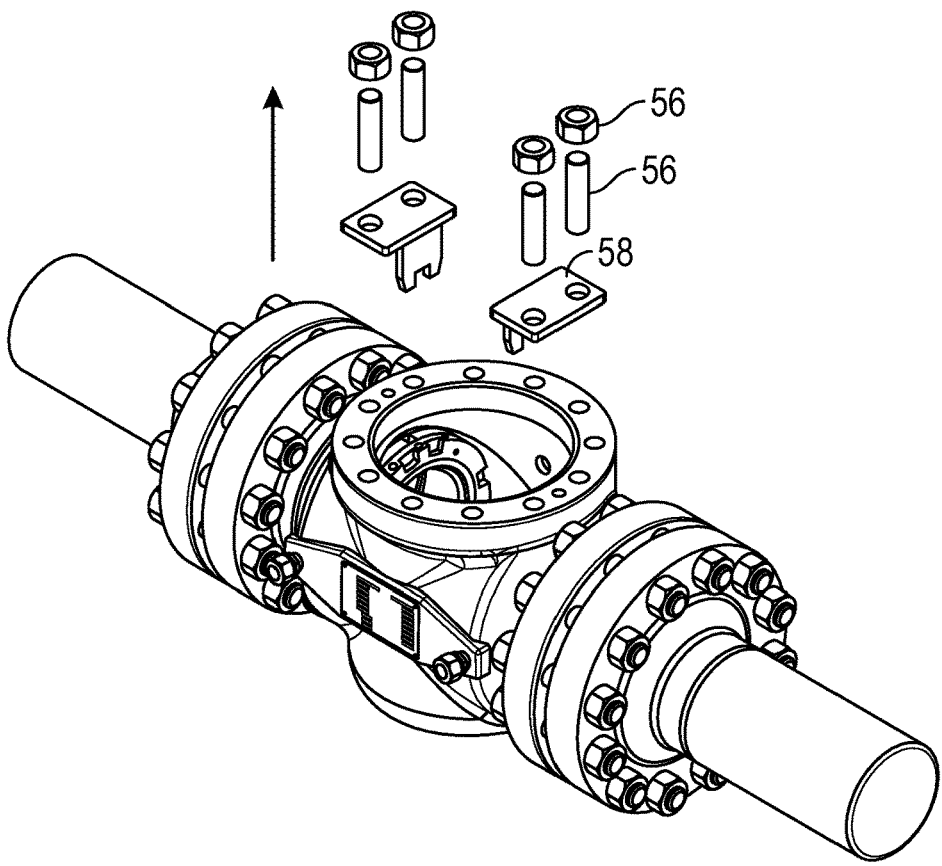
FIG. 19A is a perspective view of disassembly of a trunnion from a top entry ball valve in accord with one possible embodiment of the present invention.
Figure 19B:
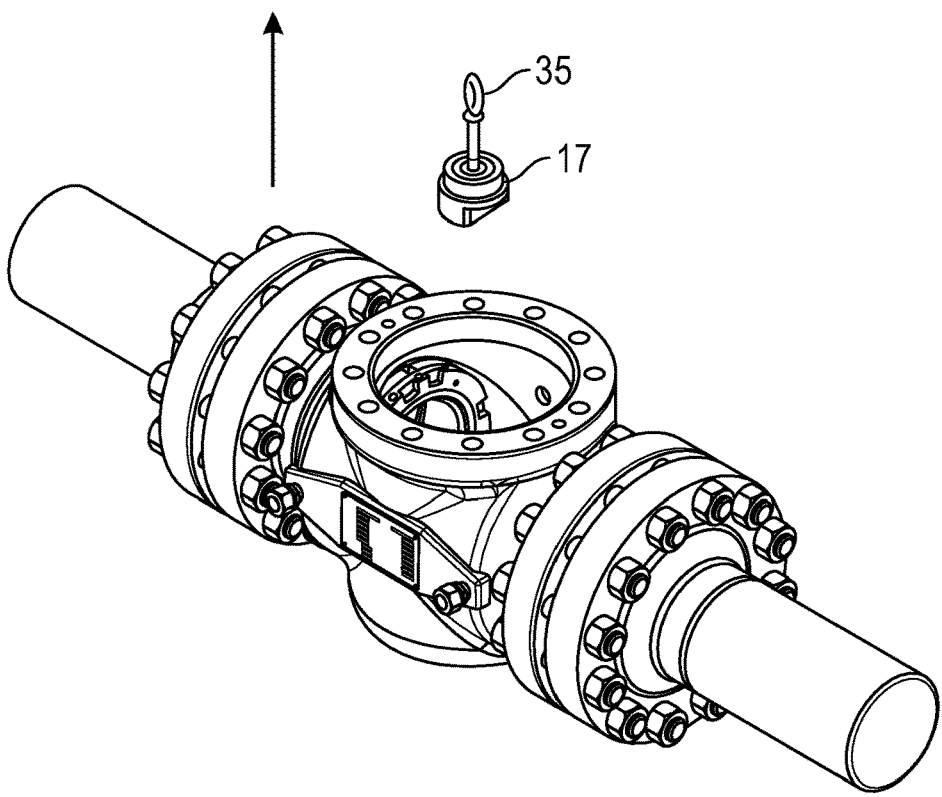
FIG. 19B is a perspective view of disassembly of a seat stopping tool from a top entry ball valve in accord with one possible embodiment of the present invention.

Once ball 2 is removed from the body 1 as shown in FIG. 18A, seat stopping tool 58 may be removed by first loosening and removing fasteners 56 as shown in FIG. 19A. The seat stopping tool 58 may then be lifted from the top of the body 1. With the ball 2 removed, there is access to the trunnion 17 as shown in FIG. 19B. An eye bolt 35 may be inserted into the top of the trunnion 17 such that it may be lifted out of the body. Therefore, the entire ball assembly has been removed from the top of the body 1.

Figure 20A:
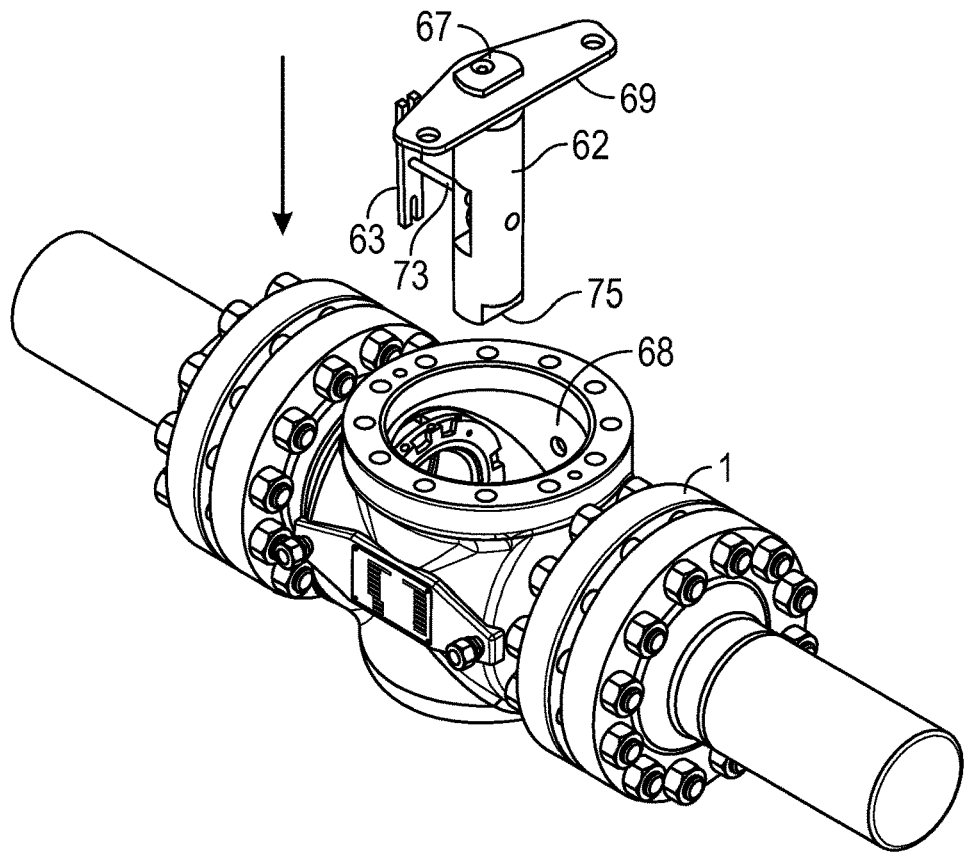
FIG. 20A is a perspective view of a seat removal tool in use for a top entry ball valve in accord with one possible embodiment of the present invention.
Figure 20B:
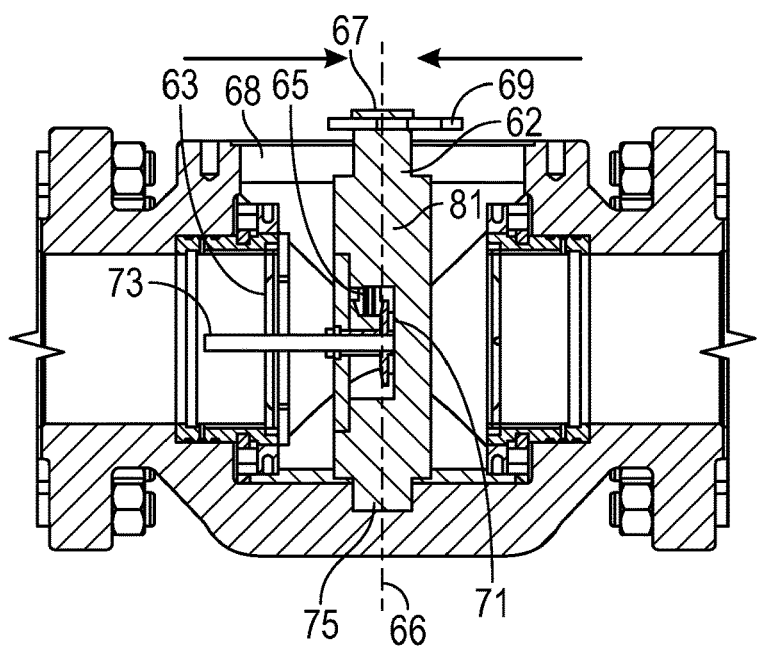
FIG. 20B is a side view of a seat removal tool in use for a top entry ball valve in accord with one possible embodiment of the present invention.

Turning to FIGS. 20A and 20B, with the ball assembly removed seat removal tool 62 may then be used to remove the seat assembly 64. Seat removal tool 62 is also shown enlarged in FIG. 22B. Seat removal tool 62 is lowered into the body 1 as indicated in FIG. 20A. Seat removal tool 62 comprises a metallic shaft 81 which may be cylindrical, square, or other shape. At the bottom of seat removal tool 62 is an extension 75 which is smaller in diameter than the tool body. The extension 75 is sized such that it fits within the slot where trunnion 17 previously was positioned thereby holding the bottom of seat removal tool 62 in place during operation. Seat removal tool 62 further comprises a flange 69 at the upper most end of the shaft. The flange 69 extends outwardly to engage the top of the body 1 whereby it may be secured in placed through bolt holes with bolts or the like. In the center of the shaft is a rod 73 extending perpendicular to the shaft whereby the rod 73 extends through the center of the seat insert 27 and other seat components such as seat carrier spring holder 28 and seat carrier spring compressor 29. However, the device could work with any seat arrangement. A seat adapter 63 is mounted on the rod 73 and is operable to move along the rod 73 to engage the seat. The seat adapter 63 may be attached to the seat and seat components whereby the seat removal tool 62 may be used to move the seat inserts 27 towards the valve centerline 66. Seat removal tool 62 may be shaped in any way to grab and pull the seat components 27-29 or a seat assembly 64 toward the center line 66 of the body 1 and then out of body 1. The seat adapter 63 may utilize an inner member 71, which could be disc shaped, cam 65, and operator 67 to pull seat adaptor 63 and the seat elements toward the center of the valve for removal. For example, cam 65 could be rotated with operator 67 to move inner member 71 toward the center of the valve thereby removing the seat elements.

Figure 21A:
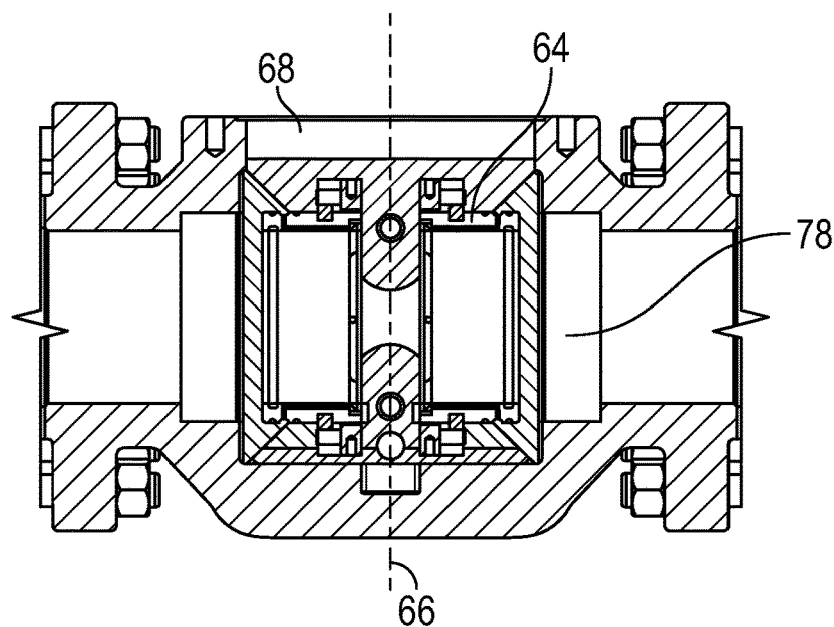
FIG. 21A is a side view of seat disassembly from a top entry ball valve in accord with one possible embodiment of the present invention.
Figure 21B:
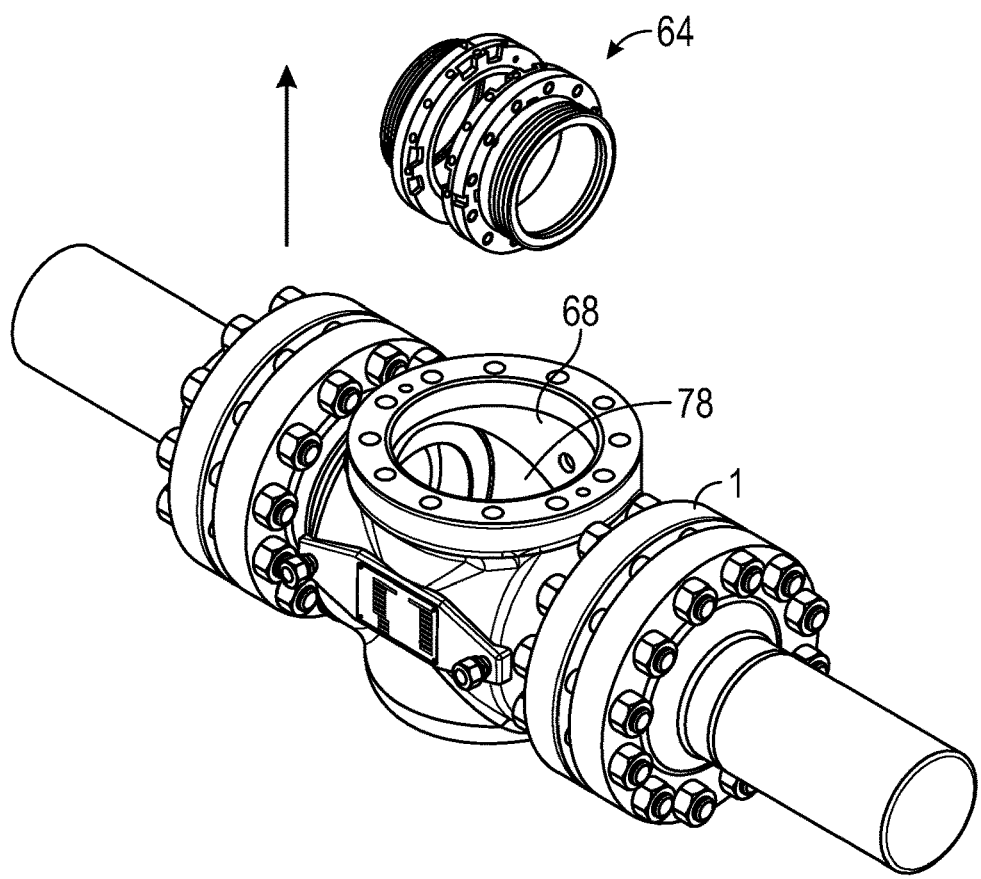
FIG. 21B is a perspective view of seat disassembly from a top entry ball valve in accord with one possible embodiment of the present invention.

In FIGS. 21A and 21B, the seat assemblies 64 have been moved to the valve centerline 66. In this position, the seat assemblies 64 now have clearance from the body cavity 78 and are no longer secured within the body cavity 78. The seat assemblies 64 may then be removed from the top of the body 1 through body opening 68 as complete units. The internal components such as any seals, the seats, springs, ball valve, or the like may then be serviced, replaced, modified, or the like as is necessary for the particular requirements of the well in which it will be operated.

Figure 22A:
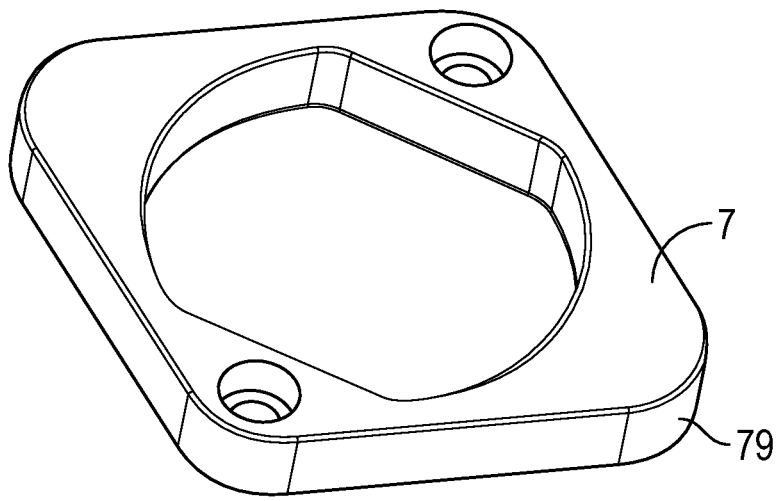
FIG. 22A is a perspective view of ball remover tool in accord with one possible embodiment of the present invention.
Figure 22B:
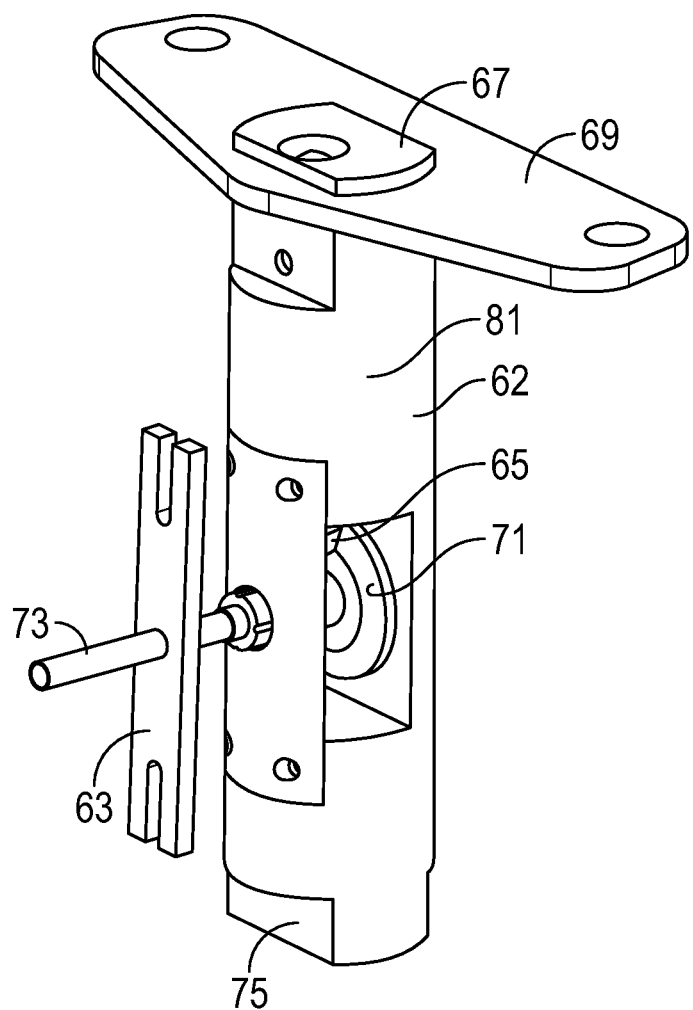
FIG. 22B is a perspective view of seat removal tool in accord with one possible embodiment of the present invention.

FIGS. 22A and 22B show a perspective view of ball remover 7 and seat removal tool 62 respectively in accord with one possible embodiment of the present invention. As indicated ball remover 7 comprises a flat plate with an opening therein along with bolt holes to secure the ball remover 7 to ball 2. FIG. 22B shows seat removal tool 62. As discussed above, comprises a shaft 81 which may be cylindrical, square, or other shape. At the bottom of seat removal tool 62 is an extension 75 which is smaller in diameter than the tool body and is sized such that it fits within a slot at the bottom of body 1. Flange 69 is at the upper most end of the shaft 81. The flange 69 extends outwardly to engage the top of the body 1 whereby it may be secured in placed with fasteners. In the center of the shaft is rod 73 extending perpendicular to the shaft 81. A seat adapter 63 is mounted on the rod 73 and is operable to move along the rod 73 to engage the seat. Seat removal tool 62 may be shaped in any way to grab, pull, or urge the seat assemblies 64 toward the valve center line 66 of the body 1. The seat adapter 63 may utilize an inner member 71, which could be disc shaped or any other desired shape, cam 65, and operator 67 to pull seat adaptor 63 and the seat elements toward the center of the valve for removal. The seat removal tool 62 could be of other arrangements such that the seat assemblies 64 may be urged towards the valve centerline 66 such that clearance is made to allow the seat assemblies 64 to be free from the body 1 and removed through the opening 68 in the top of body 1.

Figure 23A:
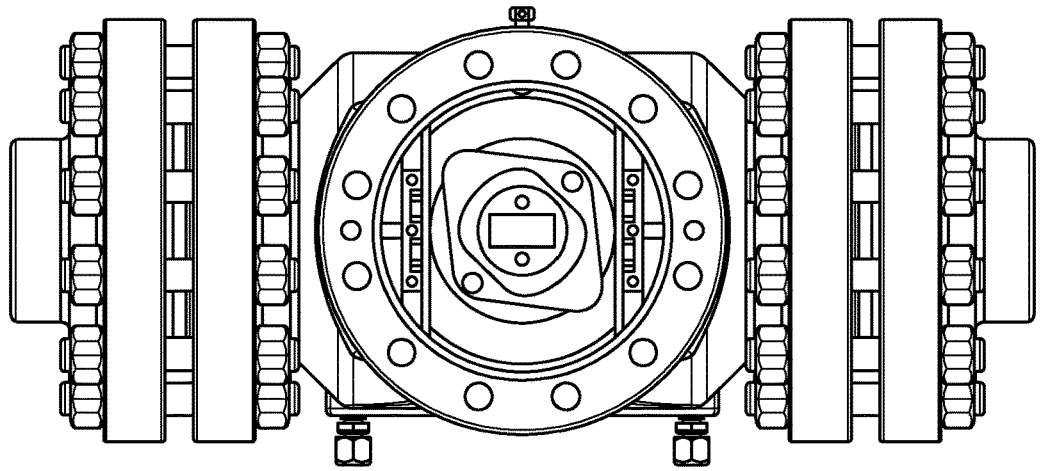
FIGS. 23A-C is a top view of a top entry ball valve in various degrees of rotation during disassembly in accord with one possible embodiment of the present invention.
Figure 23B:
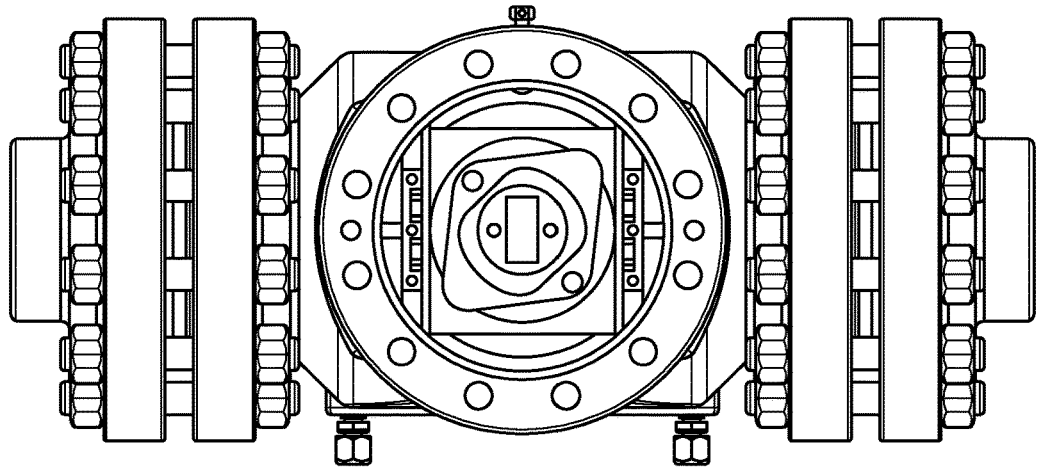
Figure 23C:
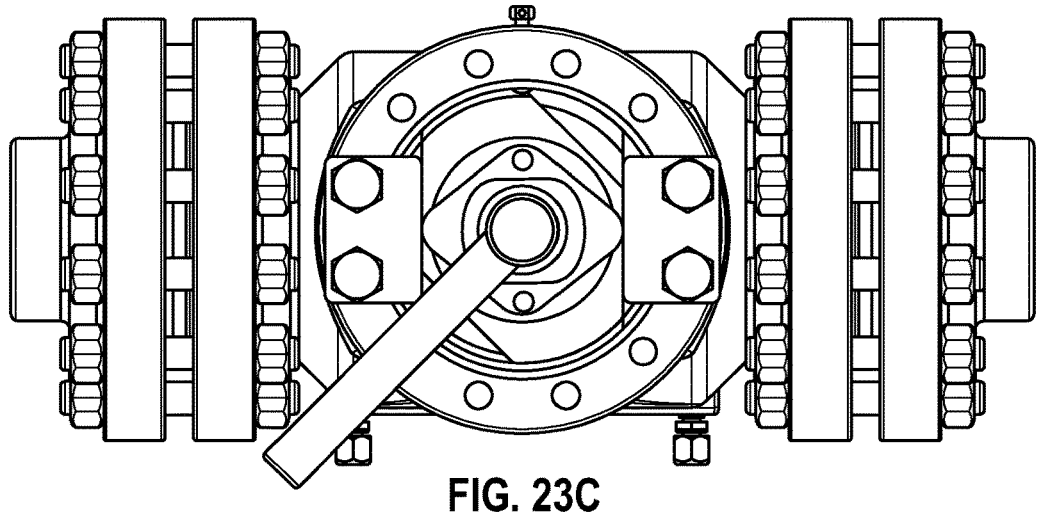

FIGS. 23A-C show a top view of a top entry ball valve in various degrees of rotation during disassembly in accord with one possible embodiment of the present invention. FIG. 23A shows the valve 100 in which the valve is in the 0 degree open position. (See FIGS. 4-9). After the reassembly of the gearbox in FIGS. 10A and 10B, the gearbox is operated to move the valve 100 to the 90 degree closed position. (See FIGS. 10A-11). After the gearbox is removed, rotated, and reinstalled the gearbox is further operated to rotate the valve further by 45 degrees such that the valve is in the 135 degree intermediate position. (See FIGS. 12A-13).

In summary, for ball valves the seats overlap over the spherical ball. Hence, for the entry and removal of the ball during assembly it is necessary to set apart the seats away from the valve centerline. The current invention's method is a unique approach to make this possible with the use of a top entry ball valve.

The foregoing disclosure and description of the invention is illustrative and explanatory thereof, and it will be appreciated by those skilled in the art, that various changes in the size, shape and materials as well as in the details of the illustrated construction or combinations of features of the various coring elements may be made without departing from the spirit of the invention. Moreover, the scope of this patent is not limited to its literal terms but instead embraces all equivalents to the claims described.

The invention claimed is:

1. A top entry ball valve method for disassembling a ball valve that is mounted to a pipeline, said ball valve comprising a valve body, cover plate, and a ball, said top entry ball valve method comprising:
    providing that a valve operator is mounted to said valve body and cover plate in an operating position;
    removing said valve operator from said valve body;
    mounting said valve operator to said valve body in a rotated position with respect to said operating position;
    utilizing said valve operator in said rotated position to rotate said ball and a cam secured to said ball so that said cam engages a seat member and urges said seat member away from a centerline through said ball;
    removing said valve operator and said cover plate;
    installing a seat stopping tool to said ball valve to engage said seat member and prevent said seat member from moving toward said centerline through said ball;
    rotating said ball to disengage said cam from said seat member;
    removing said cam;
    removing said ball;
    removing said seat stopping tool from said ball valve; and
    removing said seat member.

2. The method of claim 1 wherein said valve operator comprises one or more of a wheel and a gearbox.

3. The method of claim 2 wherein said wheel and said gearbox are configured to rotate said ball by ninety degrees.

4. The method of claim 1, further comprising prior to said step of mounting said valve operator to said valve body in said rotated position with respect to said operating position, rotating said ball to a closed valve position utilizing said valve operator when said valve operator is mounted in said operating position.

5. The method of claim 4, further comprising:
    removing said valve operator;
    removing said cover plate;
    relieving a spring pressure on one or more springs that urge said seat member into engagement with said ball;
    reinstalling said cover plate; and
    reinstalling said valve operator in said operating position.

6. The method of claim 4, further comprising: utilizing said valve operator in said rotated position to rotate said ball by one hundred thirty five degrees from said valve closed position.

7. A top entry ball valve assembly comprising a body that is connectable to a pipeline, said top entry ball valve assembly comprising:
    said body defining a body cavity therein in which a ball is mounted, said body comprising a body opening positioned at a top of said body through which said ball is mounted or removable from said body cavity when said body is connected to said pipeline;
    said ball being rotatable between an open and a closed position when said ball is mounted within said body cavity;
    a seat member that forms a seal between said ball and said body;
    a cover plate mounted to a top portion of said body cavity, said cover plate being removable from said body to expose said body opening in said body;

a valve operator to rotate said ball; and a cam mounted to said ball, said cam being moveable with rotation of said ball to a position to engage and urge said seat member away from a valve centerline, said cam being oriented so that said cam does not engage said seat member when said ball is rotated between said open and said closed position.

8. The top entry ball valve assembly of claim 7, further comprising a seat stopping tool mountable to said body in a position to engage said seat member when said seat member is urged away from said valve centerline with said cam, whereby when said seat stopping tool is engaged with said seat member then said seat stopping tool prevents said seat member from moving toward a centerline of said ball.

9. The top entry ball valve assembly of claim 8, further comprising a seat tool to release a spring, said spring being mounted to urge said seat member into engagement with said ball.

10. A top entry ball valve assembly comprising a body that is connectable to a pipeline, said top entry ball valve assembly comprising:

said body defining a body cavity therein in which a ball is mounted, said body comprising a body opening positioned at a top of said body through which said ball is mounted or removable from said body cavity when said body is connected to said pipeline;

said ball being rotatable between an open and a closed position when said ball is mounted within said body cavity;

a seat member that forms a seal between said ball and said body;

a cover plate mounted to a top portion of said body cavity, said cover plate being removable from said body to expose said body opening in said body;

a valve operator to rotate said ball between said open or closed position; and a seat stopping tool mountable to said body in a position to engage said seat member, whereby when said seat stopping tool is mounted to said body then said seat stopping tool engages said seat member to prevent said seat member from moving toward a centerline of said ball;

a cam mounted to said ball, said cam being moveable with rotation of said ball to a position to engage and urge said seat member away from said ball; and a seat tool to release a spring, said spring being mounted to urge said seat member into engagement with said ball, once said spring is released then said seat member is movable away from said ball in response to movement of said cam.

\* \* \* \* \*